United States Patent
Enbuske et al.

(10) Patent No.: US 12,207,317 B2
(45) Date of Patent: Jan. 21, 2025

(54) CONFIGURATION OF A RANDOM ACCESS PROCEDURE

(71) Applicant: Telefonaktiebolaget LM Ericsson (publ), Stockholm (SE)

(72) Inventors: Henrik Enbuske, Stockholm (SE); Jan Christoffersson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 398 days.

(21) Appl. No.: 17/609,928

(22) PCT Filed: May 11, 2020

(86) PCT No.: PCT/EP2020/062978
§ 371 (c)(1),
(2) Date: Nov. 9, 2021

(87) PCT Pub. No.: WO2020/229384
PCT Pub. Date: Nov. 19, 2020

(65) Prior Publication Data
US 2022/0225405 A1 Jul. 14, 2022

Related U.S. Application Data

(60) Provisional application No. 62/847,706, filed on May 14, 2019.

(51) Int. Cl.
*H04W 74/08* (2024.01)
*H04W 74/0833* (2024.01)
(Continued)

(52) U.S. Cl.
CPC ......... *H04W 74/085* (2013.01); *H04W 76/20* (2018.02); *H04W 80/02* (2013.01)

(58) Field of Classification Search
CPC ............ H04W 74/085; H04W 74/006; H04W 74/0833; H04W 76/20; H04W 76/27; H04W 80/02; H04W 72/21; H04W 72/23
(Continued)

(56) References Cited

U.S. PATENT DOCUMENTS

2017/0318606 A1   11/2017  Lee et al.
2020/0329504 A1*  10/2020  Kunt ................. H04W 74/0833
(Continued)

FOREIGN PATENT DOCUMENTS

WO    WO-2020184954 A1 *  9/2020  ........... H04L 1/0003

OTHER PUBLICATIONS

Email Discussion Rapporteur (ZTE), "Procedures and mgsB content [105bis#30][NR/2-step RACH]", 3GPP TSG-WG2 Meeting #106, R2-1906308, Reno, USA, May 13-17, 2019, 1-91.
(Continued)

*Primary Examiner* — Candal Elpenord
(74) *Attorney, Agent, or Firm* — Murphy, Bilak & Homiller, PLLC

(57) ABSTRACT

A wireless device is configured to receive information from a network node. The information indicates whether or not a medium access control, MAC, service data unit, SDU, for a signaling radio bearer, SRB, or data radio bearer, DRB, is to be received by the wireless device in the same MAC protocol data unit, PDU, as a MAC PDU carrying a random access success response message. This random access success response message indicates both a random access channel and an uplink shared channel payload were decoded successfully. In some embodiments, the wireless device is configured to receive a MAC PDU carrying the random access success response message, and to process the received MAC PDU based on the received information
(Continued)

indicating whether a MAC SDU for an SRB or DRB is included in the received MAC PDU.

23 Claims, 18 Drawing Sheets

(51) Int. Cl.
  *H04W 76/20* (2018.01)
  *H04W 80/02* (2009.01)
(58) Field of Classification Search
  USPC .................................................. 370/329–330
  See application file for complete search history.

(56) References Cited

U.S. PATENT DOCUMENTS

2021/0120581 A1* 4/2021 Kim ..................... H04W 76/27
2022/0132591 A1* 4/2022 Agiwal ............. H04W 74/0866

OTHER PUBLICATIONS

3GPP, "3GPP TS 38.331 V15.5.1", 3rd Generation Partnership Project; Technical Specification Group Radio Access Network; NR; Radio Resource Control (RRC) protocol specification (Release 15), Apr. 2019, 1-491.
3GPP, "3rd Generation Partnership Project; Technical Specification Group Radio Access Network; NR; Medium Access Control (MAC) protocol specification (Release 15)", 3GPP TS 38.321 V15.4.0, Dec. 2018, 1-77.
3GPP, "3rd Generation Partnership Project; Technical Specification Group Radio Access Network; NR; Medium Access Control (MAC) protocol specification (Release 15) 3GPP TS 38.321 V15.5.0", 3GPP TS 38.321 V15.5.0, Mar. 2019, 1-78.
Zte, et al., "Transmission of MAC SDU for SRB/DRB in 2-step RACH", 3GPP TSG-WG2 Meeting #106, R2-1906307, USA, Reno, May 13-17, 2019, 1-4.

* cited by examiner

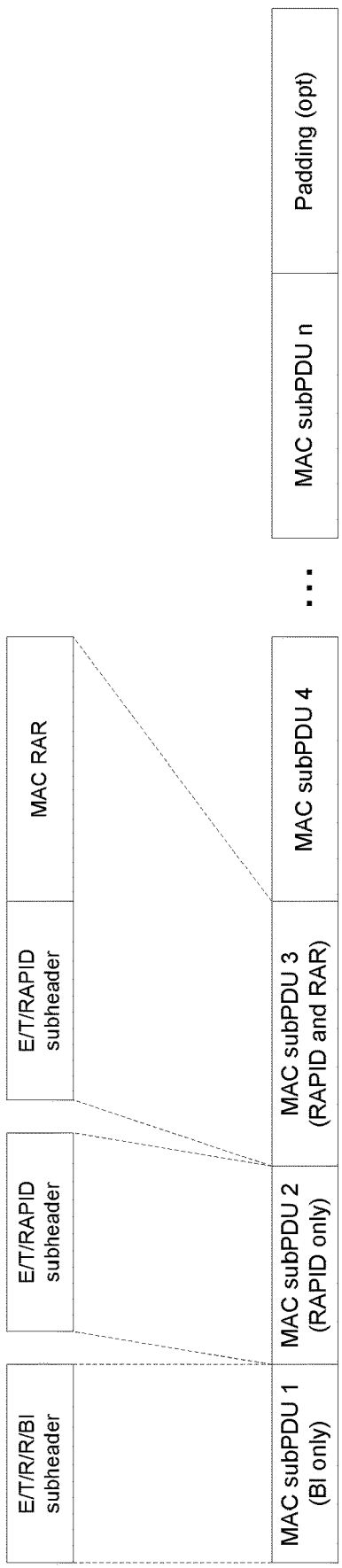
FIGURE 7
FIGURE 9
FIGURE 8

CONFIGURATION OF A RANDOM ACCESS PROCEDURE

TECHNICAL FIELD

The present application relates generally to a wireless communication network, and relates more particularly to configuration of a random access procedure in such a network.

BACKGROUND

Random access in a wireless communication network may be performed by a wireless device to, for example, acquire uplink synchronization and/or to establish or resume a radio resource control (RRC) connection. The traditional contention-based random access procedure includes 4 steps in which the wireless device and network engage in two successive rounds of a wireless device transmission and a network response. To reduce the duration of the procedure and corresponding latency attributable to the procedure, a 2-step random access procedure condenses the procedure into only one round of a wireless device transmission and a network response.

Some contexts complicate the 2-step random access procedure. If the single network response in the 2-step procedure includes all of the same information as the two network responses in the 4-step procedure (e.g., including the RRC signalling), the delay and latency improvements from the 2-step nature of the procedure are hampered. On the other hand, including only some of that information in the single network response of the 2-step procedure, such that the remaining information (e.g., the RRC signalling) must be transmitted separately from the network response, may likewise hamper latency improvements in unlicensed frequency deployments that require the unlicensed frequency channel to be cleared before each separate transmission.

SUMMARY

According to some embodiments herein, a network node transmits information to a wireless device for configuring a random access procedure. The transmitted information may indicate what information is to be included in the network response of a 2-step random access procedure. Some embodiments may thereby make the network response configurable in terms of what information the network response includes, e.g., so that the network response may include different information under different circumstances or conditions. The circumstances or conditions may for instance account for unlicensed vs. licensed frequency deployments, network loading, etc.

More particularly, embodiments herein include a method performed by a wireless device. The method comprises receiving, from a network node, information indicating whether or not a medium access control, MAC, service data unit, SDU, for a signaling radio bearer, SRB, or data radio bearer, DRB, is to be received by the wireless device in the same MAC protocol data unit, PDU, as a MAC PDU carrying a random access success response message. The random access success response message indicates both a random access channel and an uplink shared channel payload were decoded successfully.

In some embodiments, the MAC SDU for an SRB or DRB includes or conveys radio resource control, RRC, signaling.

In some embodiments, the information comprises system information.

In some embodiments, the information further indicates one or more parameter values that govern reception of the random access success response message or a MAC PDU carrying the random access success response message, wherein the one or more parameter values include one or more of: a value for a reception window within which the wireless device must receive the random access success response message or a MAC PDU carrying the random access success response message; or an identity with which the wireless device is to descramble a control channel on which, or a control channel search space within which, the random access success response message or a MAC PDU carrying the random access success response message is to be sent.

In some embodiments, the information further indicates a backoff procedure for random access by the wireless device.

In some embodiments, the method further comprises receiving a MAC PDU carrying the random access success response message. In one embodiment, the method further comprises processing the received MAC PDU based on the received information indicating whether a MAC SDU for an SRB or DRB is included in the received MAC PDU.

In some embodiments, the method further comprises stopping a random access response reception timer upon: determining that the random access success response message has been received; receiving the random access success response message; or receiving the MAC PDU carrying the random access success response message. Here, the random access response reception timer has a value that depends or is based on whether a MAC SDU for an SRB or DRB is to be received by the wireless device in the same PAC PDU as a MAC PDU carrying the random access success response message. In one such embodiment, the method further comprises starting the random access response reception timer after an uplink shared channel transmission opportunity for transmission of a message conveying the random access channel and the uplink shared channel payload.

In some embodiments, the method further comprises determining a value for a random access response reception timer based on the received information.

In some embodiments, the method further comprises determining, based on the received information, a radio network temporary identity to use for receiving the random access success response message.

In some embodiments, one or more of: the random access channel and the uplink shared channel payload are transmitted within unlicensed frequency spectrum; or the MAC PDU carrying the random access success response message is received within unlicensed frequency spectrum.

In some embodiments, the information indicates one or more conditions under which the MAC SDU for an SRB or DRB is to be received by the wireless device in the same MAC PDU as a MAC PDU carrying the random access success response message and/or indicates one or more conditions under which the MAC SDU for an SRB or DRB is not to be received by the wireless device in the same MAC PDU as a MAC PDU carrying the random access success response message.

In some embodiments, the information indicates one or more of: the MAC SDU for an SRB or DRB is to be received by the wireless device in the same MAC PDU as a MAC PDU carrying the random access success response message when the wireless device is in an idle mode or an inactive mode; or the MAC SDU for an SRB or DRB is to be received by the wireless device in a different MAC PDU than a MAC PDU carrying the random access success response message when the wireless device is in a connected mode.

Embodiments herein also include a method performed by a network node. The method comprises transmitting, from the network node to a wireless device, information indicating whether or not a medium access control, MAC, service data unit, SDU, for a signaling radio bearer, SRB, or data radio bearer, DRB, is to be received by the wireless device in the same MAC protocol data unit, PDU, as a MAC PDU carrying a random access success response message. The random access success response message indicates both a random access channel and an uplink shared channel payload were decoded successfully.

In some embodiments, the MAC SDU for an SRB or DRB includes or conveys radio resource control, RRC, signaling.

In some embodiments, the information comprises system information.

In some embodiments, the information further indicates one or more parameter values that govern reception of the random access success response message or a MAC PDU carrying the random access success response message, wherein the one or more parameter values include one or more of: a value for a reception window within which the wireless device must receive the random access success response message or a MAC PDU carrying the random access success response message; or an identity with which the wireless device is to descramble a control channel on which, or a control channel search space within which, the random access success response message or a MAC PDU carrying the random access success response message is to be sent.

In some embodiments, the information further indicates a backoff procedure for random access by the wireless device.

In some embodiments, the method further comprises transmitting a MAC PDU carrying the random access success response message. In one such embodiment, the method further comprises determining whether or not the MAC SDU for an SRB or DRB is to be received by the wireless device in the same MAC PDU as a MAC PDU carrying the random access success response message. In one embodiment, said determining is based on one or more of: a type of network deployment within which the network node is deployed; expected radio resource control, RRC, processing delay; delay between a central unit and a distributed unit of the network node; or cell layout. In some embodiments, said determining is based on one or more of: a category or type of the wireless device; whether the wireless device is in connected mode, idle mode, or inactive mode; a random access trigger; a priority of the wireless device or of a transmission for the wireless device; a random access load; or radio resource control, RRC, processing load.

In some embodiments, the information further indicates a value for a random access response reception timer. In one such embodiment, the method further comprises determining the value of the random access response reception timer based on whether a MAC SDU for an SRB or DRB is included in the received MAC PDU is to be received by the wireless device in the same PAC PDU as a MAC PDU carrying the random access success response message.

In some embodiments, one or more of: the random access channel and the uplink shared channel payload are received within unlicensed frequency spectrum; or the MAC PDU carrying the random access success response message is transmitted within unlicensed frequency spectrum.

In some embodiments, the information indicates one or more conditions under which the MAC SDU for an SRB or DRB is to be received by the wireless device in the same MAC PDU as a MAC PDU carrying the random access success response message and/or indicates one or more conditions under which the MAC SDU for an SRB or DRB is not to be received by the wireless device in the same MAC PDU as a MAC PDU carrying the random access success response message.

In some embodiments, the information indicates one or more of: the MAC SDU for an SRB or DRB is to be received by the wireless device in the same MAC PDU as a MAC PDU carrying the random access success response message when the wireless device is in an idle mode or an inactive mode; or the MAC SDU for an SRB or DRB is to be received by the wireless device in a different MAC PDU than a MAC PDU carrying the random access success response message when the wireless device is in a connected mode.

Embodiments herein also include corresponding apparatus, computer programs, and carriers of those computer programs. For example, embodiments herein include a wireless device, e.g., comprising communication circuitry and processing circuitry. The wireless device is configured to receive, from a network node, information indicating whether or not a medium access control, MAC, service data unit, SDU, for a signaling radio bearer, SRB, or data radio bearer, DRB, is to be received by the wireless device in the same MAC protocol data unit, PDU, as a MAC PDU carrying a random access success response message. The random access success response message indicates both a random access channel and an uplink shared channel payload were decoded successfully.

Embodiments herein further include a network node, e.g., comprising communication circuitry and processing circuitry. The network node is configured to transmit, from the network node to a wireless device, information indicating whether or not a medium access control, MAC, service data unit, SDU, for a signaling radio bearer, SRB, or data radio bearer, DRB, is to be received by the wireless device in the same MAC protocol data unit, PDU, as a MAC PDU carrying a random access success response message. The random access success response message indicates both a random access channel and an uplink shared channel payload were decoded successfully.

BRIEF DESCRIPTION OF THE DRAWINGS

FIG. 7 is a block diagram of a MAC PDU consisting of MAC random access responses (RARs).

FIG. 8 is a block diagram of a MAC subheader with Backoff Indicator.

FIG. 9 is a block diagram of a MAC subheader with RAPID.

DETAILED DESCRIPTION

Figure 1:
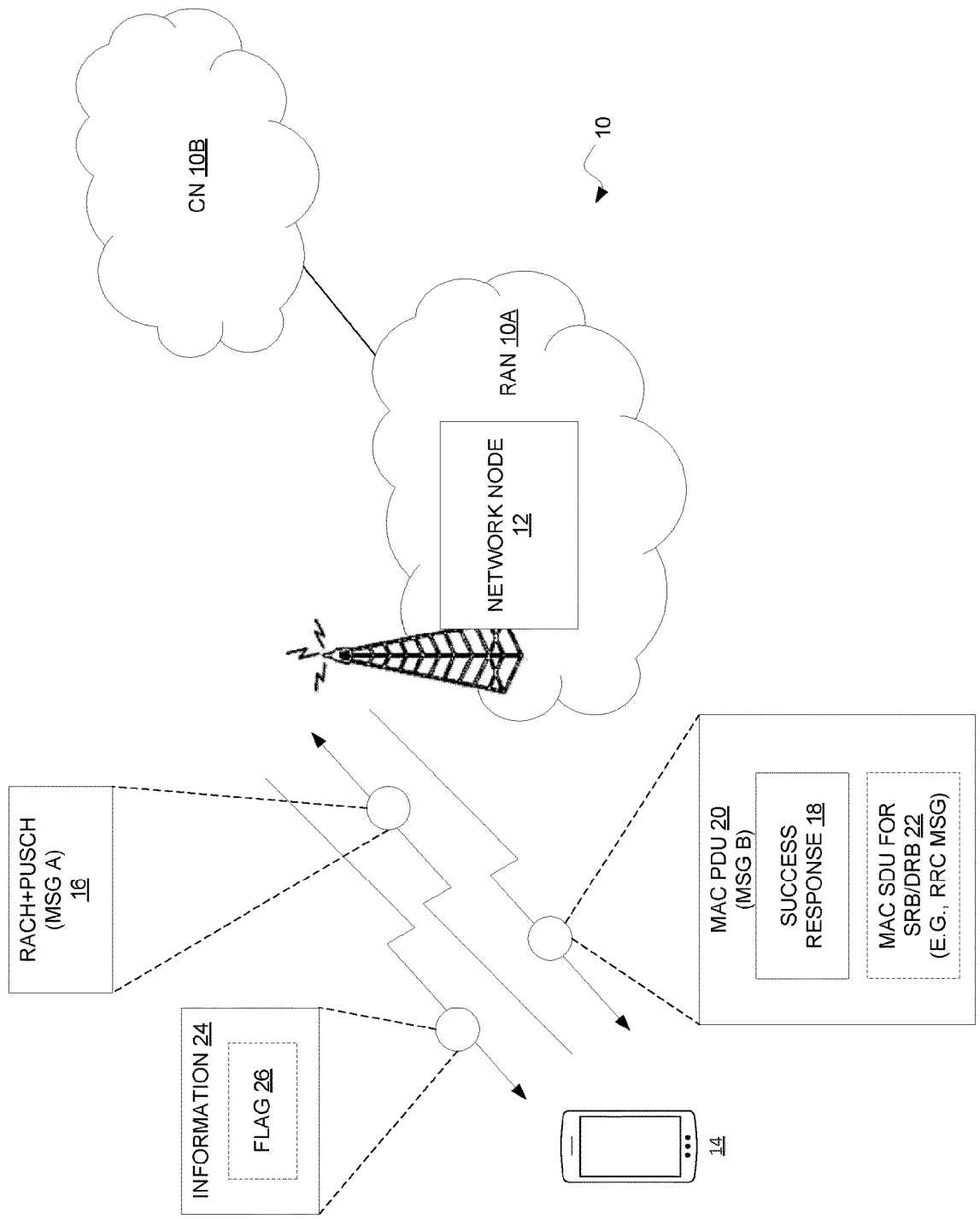
FIG. 1 is a block diagram of a wireless communication network according to some embodiments.

FIG. 1 shows a wireless communication network 10 according to some embodiments. The wireless communication network 10 includes a radio access network (RAN) 10A (e.g., based on New Radio, NR) and a core network (CN) 10B. The RAN 10A includes a network node 12 (e.g., base station) that provides radio access to a wireless device 14. In some embodiments (e.g., where the RAN 10A is an NR Unlicensed, NR-U, network), this radio access may be provided in unlicensed frequency spectrum. The unlicensed frequency spectrum is frequency spectrum within which transmissions may be performed without a license from a licensor (which may be a regulatory or governing entity, e.g., the United States Federal Communications Commission, FCC, or the International Telecommunication Union, ITU). Regardless, the RAN 10A via the radio access connects the wireless device 14 to the CN 10B, which may in turn connect to one or more data networks (e.g., the Internet).

The wireless device 14 is configured to perform a random access procedure with the network node 12. The random access procedure may for instance be performed in order for the wireless device 14 to acquire uplink synchronization, to establish or resume a radio resource control (RRC) connection, etc.

The random access procedure as shown includes two steps, e.g., as opposed to the conventional 4 steps. In the first step, the wireless device 14 performs a transmission 16 on a random access channel (RACH) and an uplink shared channel (e.g., a physical uplink shared channel, PUSCH). This transmission 16 may be referred to as MSG A. The transmission 16 on the RACH may convey a random access preamble. The transmission 16 on the uplink shared channel may convey an RRC establishment request or RRC resume request. The transmission 16 on the RACH and the transmission 16 on the uplink shared channel may be performed in the same subframe, or in successive subframes, e.g., such that the transmission 16 on the uplink shared channel is performed before any response is received to the transmission 16 on the RACH.

In the second step, the network node 12 transmits a response to the RACH and uplink shared channel transmission 16. If the network node 12 successfully decoded the RACH and the uplink shared channel payload, the network node 12 transmits a random access success response message (also referred to as a random access success response, or simply, success response). This random access success response message correspondingly indicates that both the RACH and the uplink shared channel payload were decoded successfully. Note in this regard that, unlike the traditional 4-step procedure, the random access success response is transmitted as a response to both the RACH and the uplink shared channel transmission 16.

In any event, the network node 12 in some embodiments conveys this random access success response message 18 within or as a transmission referred to as MSG B. In one or more embodiments, for instance, the random access success response message 18 is included in a medium access control (MAC) protocol data unit (PDU) 20. In one embodiment, this MAC PDU 20 may be a shared message that it is addressed to multiple wireless devices, e.g., because it includes multiple random access success responses for respective ones of the wireless devices. Regardless, in some embodiments, the random access success response message 18 includes a contention resolution identity, a cell radio network temporary identity (C-RNTI), a timing advance (TA) command, an uplink grant, and/or a random access preamble identifier (RAPID).

According to embodiments herein, it is configurable as to whether or not the MAC PDU 20 carrying the random access success response message 18 also includes a MAC service data unit (SDU) 22 for a signaling radio bearer (SRB) or a data radio bearer (DRB). The MAC SDU 22 for an SRB may convey for instance RRC signaling, e.g., in the form of one or more RRC messages such as an RRC setup message or an RRC resume message. Alternatively or additionally, the MAC SDU 22 for a DRB may convey user plane data, e.g., for an early data transmission. With regard to RRC signaling, then, it is configurable as to whether or not the MAC PDU 20 carrying the random access success response message 18 includes RRC signaling.

In some embodiments, this configurability is realized by way of the network node 12 transmitting information 24 to the wireless device 14. The information 24 may for instance comprise system information (SI), e.g., included in a System Information Block Type 1, SIB1, wherein the SIB1 indicates scheduling of one or more other System Information Blocks. In other embodiments, the information 24 may comprise or be included in dedicated RRC signaling. Regardless, in some embodiments, the information 24 (e.g., in the form of a flag 26) indicates whether or not the MAC SDU 22 for an SRB or DRB is to be received by the wireless device 14 in the same MAC PDU as the MAC PDU 20 carrying the random access success response message 18. Equivalently, the information 24 may indicate whether or not the MAC SDU 22 for an SRB or DRB is to be received by the wireless device 14 in a different MAC PDU than the MAC PDU 20 carrying the random access success response message 18.

In some embodiments, the information 24 further indicates one or more parameter values that govern reception of the random access success response message 18 (or the MAC PDU 20 carrying the message 18). For example, the one or more parameter values may include a value for a reception window within which the wireless device 14 must receive the random access success response message 18 or the MAC PDU 20 carrying the random access success response message 18. Alternatively or additionally, the one or more parameter values may include an identity (e.g., Cell Radio Network Temporary Identity, C-RNTI, or Random Access RNTI, RA-RNTI) with which the wireless device 14 is to descramble a control channel on which, or a control channel search space within which, the random access success response message 18 or a MAC PDU 20 carrying the random access success response message 18 is to be sent. Alternatively or additionally, the information 24 may indicate a backoff procedure for random access by the wireless device 14.

Regardless, in some embodiments, the wireless device 14 processes the received MAC PDU 20 based on the received information 24. For example, in some embodiments, one or more parameter values governing random access depend on or are otherwise based on whether a MAC SDU 22 for an SRB or DRB is included in the received MAC PDU 20. For example, in these and other embodiments, a random access response reception timer (corresponding to the reception window) has a value that depends or is based on whether the MAC SDU 22 for an SRB or DRB is to be received by the wireless device 14 in the same PAC PDU as a MAC PDU 20 carrying the random access success response message 18. The timer value (and reception window) may be relatively larger or smaller, for instance, depending respectively on whether or not the MAC SDU 22 for the SRB or DRB is to be received by the wireless device 14 in the same PAC PDU as a MAC PDU 20 carrying the random access success response message 18. In these and other embodiments, then, the wireless device 14 may determine the value for the random access response reception timer (i.e., the reception window) based on the received information 24. Alternatively or additionally, a radio network temporary identity (e.g., C-RNTI) may be determined based on the received information 24.

Configurability via the information 24 may advantageously enable the network node 12 to adapt inclusion of the MAC SDU 22 for SRB or DRB in the MAC PDU 20 carrying the success response 18, e.g., on an as-needed basis to account for varying circumstances or conditions, or to account for a specific network deployment (e.g., in unlicensed frequency spectrum). In some embodiments, for instance, the network node 12 may determine whether or not the MAC SDU 22 for an SRB or DRB is to be included in the same MAC PDU as the MAC PDU 20 carrying the random access success response message 18 based on one or more of: a type of network deployment within which the network node 12 is deployed; expected radio resource control, RRC, processing delay; delay between a central unit and a distributed unit of the network node 12; cell layout; a category or type of the wireless device 14; whether the wireless device 14 is in connected mode, idle mode, or inactive mode; a random access trigger; a priority of the wireless device 14 or of a transmission for the wireless device 14; a random access load; and/or radio resource control, RRC, processing load.

Figure 2:
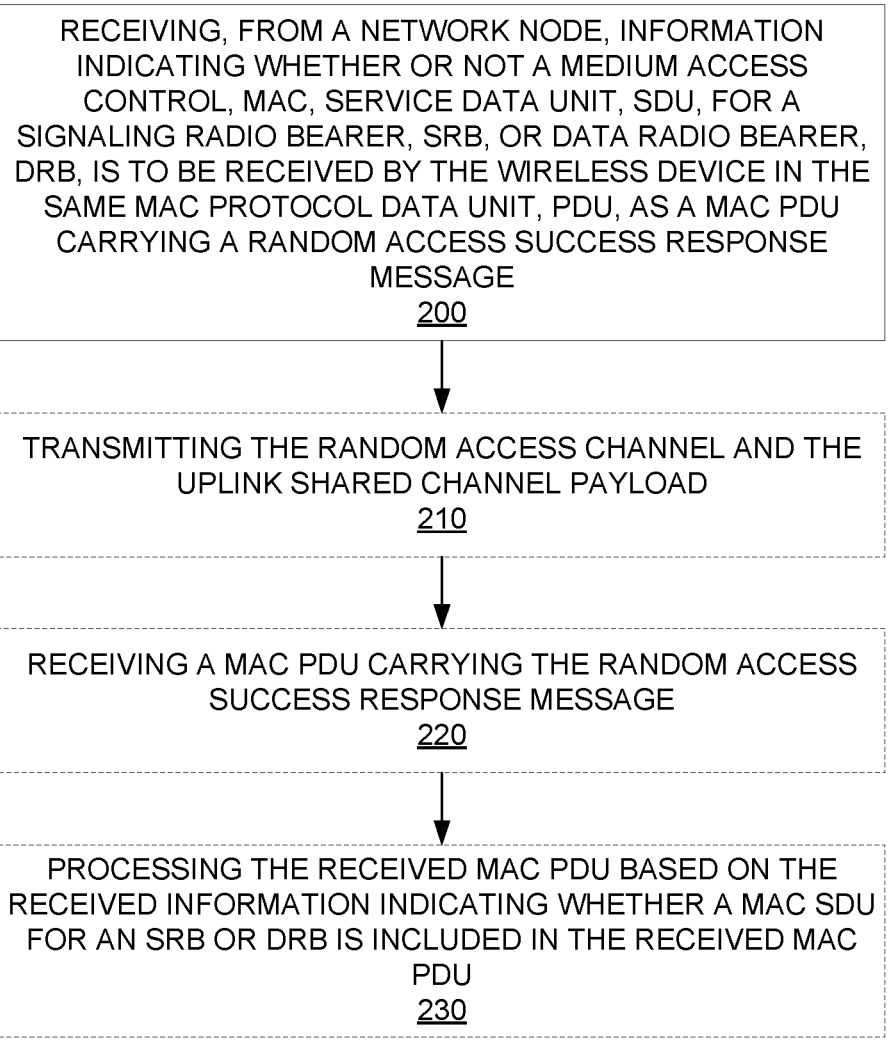
FIG. 2 is a logic flow diagram of a method performed by a wireless device according to some embodiments.

In view of the above modifications and variations, FIG. 2 depicts a method performed by a wireless device 14 in accordance with particular embodiments. The method includes receiving, from a network node 12, information 24 indicating whether or not a medium access control, MAC, service data unit, SDU, 22 for a signaling radio bearer, SRB, or data radio bearer, DRB, is to be received by the wireless device 14 in the same MAC protocol data unit, PDU, as a MAC PDU 20 carrying a random access success response message 18 (Block 200). In some embodiments, the random access success response message 18 indicates both a random access channel and an uplink shared channel payload were decoded successfully.

In some embodiments, the method may further include transmitting the random access channel and the uplink shared channel payload, e.g., as conveyed by msgA described herein (Block 210). The method may alternatively or additionally include receiving a MAC PDU 20 carrying the random access success response message 18 (Block 220). The method in some embodiments further includes processing the received MAC PDU 20 based on the received information 24 indicating whether a MAC SDU 22 for an SRB or DRB is included in the received MAC PDU 20 (Block 230).

Figure 3:
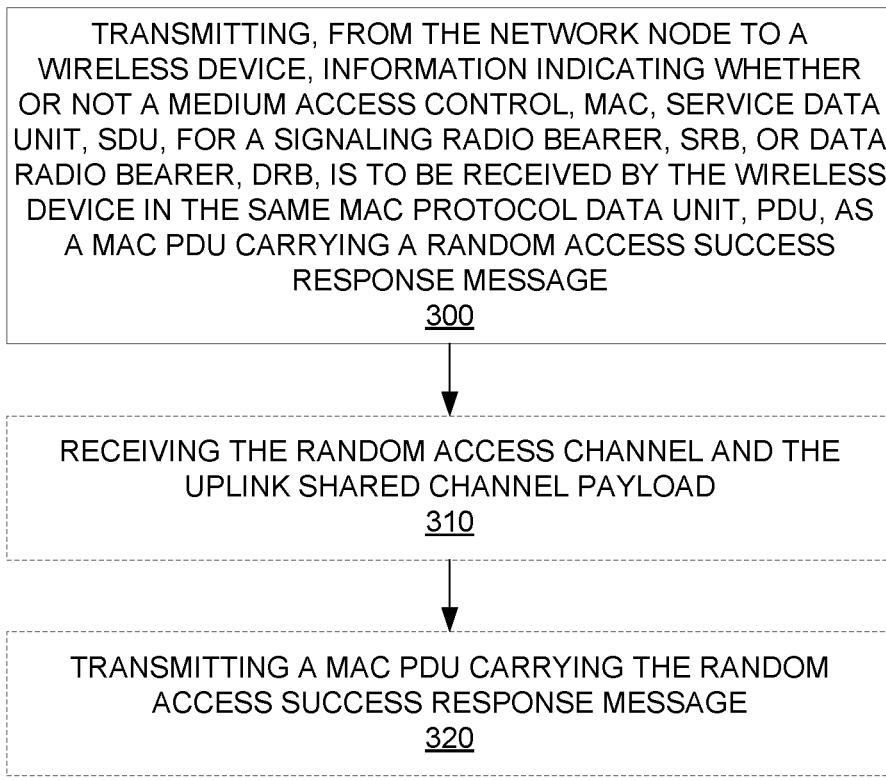
FIG. 3 is a logic flow diagram of a method performed by a network node according to some embodiments.

FIG. 3 depicts a method performed by a network node 12 in accordance with other particular embodiments. The method includes transmitting, from the network node 12 to a wireless device 14, information 24 indicating whether or not a medium access control, MAC, service data unit, SDU, 22 for a signaling radio bearer, SRB, or data radio bearer, DRB, is to be received by the wireless device 14 in the same MAC protocol data unit, PDU, as a MAC PDU 20 carrying a random access success response message 18 (Block 300). In some embodiments, the random access success response message 18 indicates both a random access channel and an uplink shared channel payload were decoded successfully.

In some embodiments, the method may further include receiving the random access channel and the uplink shared channel payload, e.g., as conveyed by msgA described herein (Block 310). The method may alternatively or additionally include transmitting a MAC PDU 20 carrying the random access success response message 18 (Block 320).

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4:
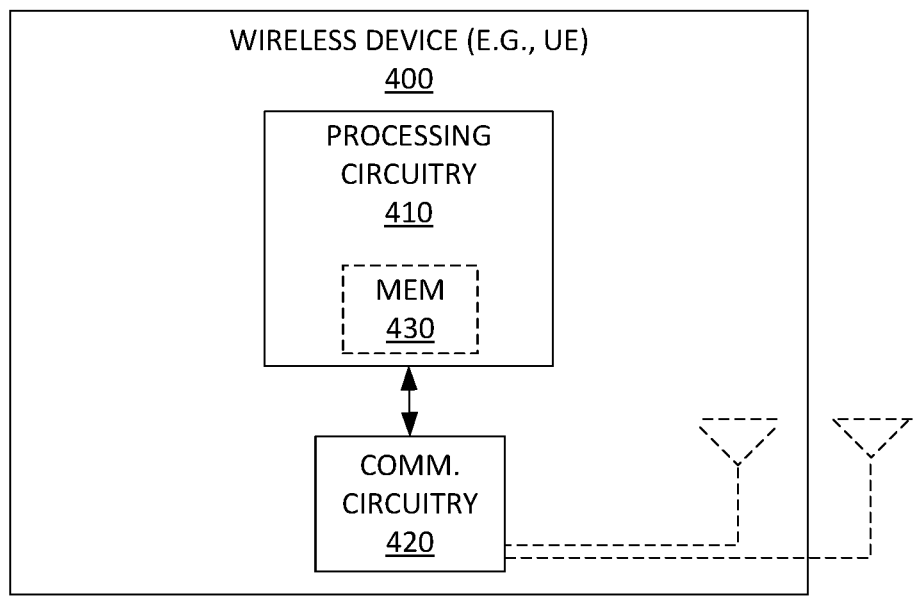
FIG. 4 is a logic flow diagram of a wireless device according to some embodiments.

FIG. 4 for example illustrates a wireless device 400 (e.g., wireless device 14) as implemented in accordance with one or more embodiments. As shown, the wireless device 400 includes processing circuitry 410 and communication circuitry 420. The communication circuitry 420 (e.g., radio circuitry) is configured to transmit and/or receive information to and/or from one or more other nodes, e.g., via any communication technology. Such communication may occur via one or more antennas that are either internal or external to the wireless device 400. The processing circuitry

410 is configured to perform processing described above, e.g., in FIG. 2, such as by executing instructions stored in memory 430. The processing circuitry 410 in this regard may implement certain functional means, units, or modules.

Figure 5:
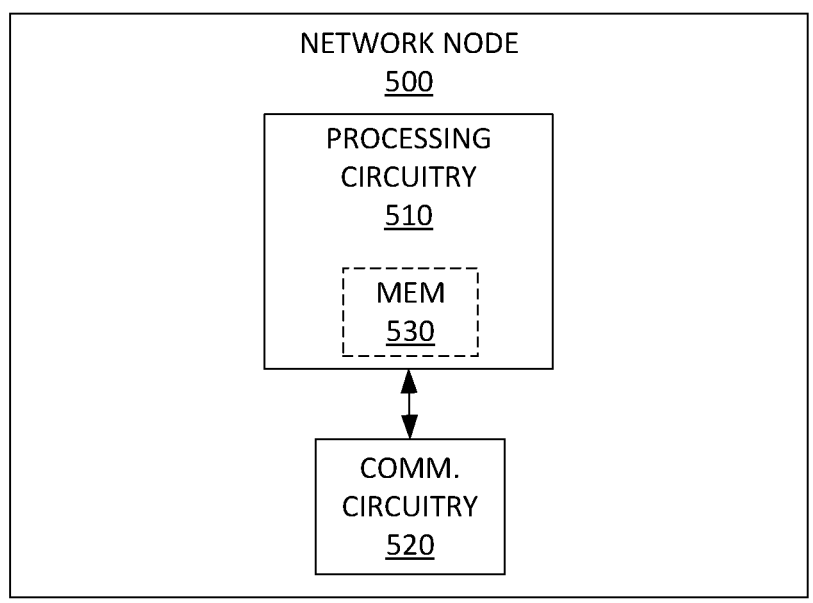
FIG. 5 is a logic flow diagram of a network node according to some embodiments.

FIG. 5 illustrates a network node 500 (e.g., network node 12) as implemented in accordance with one or more embodiments. As shown, the network node 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, e.g., in FIG. 3, such as by executing instructions stored in memory 530. The processing circuitry 510 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described. In the below embodiments, though, the wireless device 14 may be exemplified as a UE, the network node 12 may be exemplified as an eNB or gNB, the MAC SDU 22 for an SRB or DRB may be exemplified as conveying an RRC message, and the random access success response message 18 may be exemplified as a successRAR message. Accordingly, in the below embodiments, Option 1 corresponds to the MAC PDU 20 not including a MAC SDU 22 for an SRB or DRB, whereas Option 2 corresponds to the MAC PDU 20 including a MAC SDU 22 for an SRB or DRB.

Figure 6:
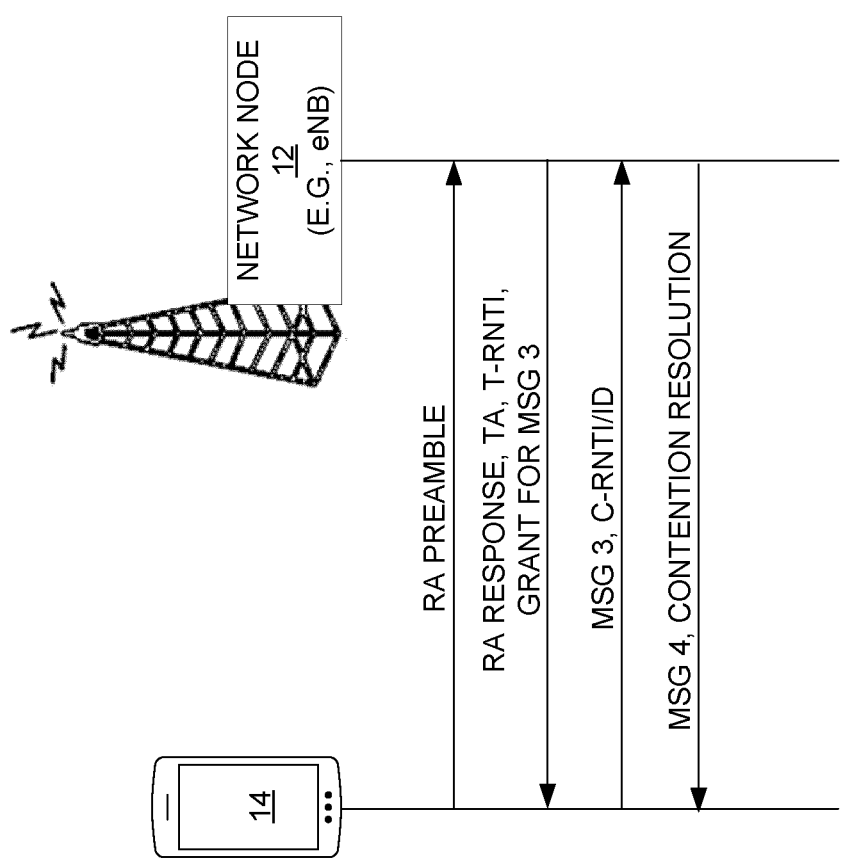
FIG. 6 is a call flow diagram of a 4-step random access procedure.

FIG. 6 shows a legacy 4-step Random Access (RA) that is the baseline for both Long Term Evolution (LTE) and New Radio (NR). The user equipment (UE) in this 4-step procedure randomly selects a preamble to transmit. The UE then starts the ra-ResponseWindow in which the RA Response (RAR) message must be received. The maximum duration of the ra-ResponseWindow is 10 ms (20 ms is discussed for NR Unlicensed, NR-U).

When the eNB detects the preamble, it estimates the Timing alignment (TA) the UE should use in order to obtain uplink (UL) synchronization at the eNB. The eNB responds with the TA and a grant for Msg3 in the RAR message.

In Msg3, the UE transmits its identifier for contention resolution (part of RRC message or C-RNTI). Upon transmission of Msg3, the UE starts the ra-ContentionResolutionTimer in which Msg4 must be received. The maximum configurable duration is 64 sub frames (64 ms). The reason why this timer is longer than the ra-ResponseWindow is that it may involve RRC processing and needs to account for centralized unit (CU)/distributed unit (DU) delays, where a CU and DU may be different parts of the eNB that implement different layers of a protocol stack, e.g., the CU may terminate higher layer and/or less time-critical protocols, such as the Packet Data Convergence Protocol (PDCP) and Radio Resource Control (RRC) protocols, whereas the DU by contrast may terminate lower layer and/or more time-critical protocols, such as the Radio Link Control (RLC), Medium Access Control (MAC), and physical layer protocols.

In any event, to gNB responds by acknowledging the UE id in Msg 4. The Msg 4 gives contention resolution, i.e. only one UE's identifier will be sent even if several UEs have used the same preamble (and Msg 3) simultaneously. A UE which has successful contention resolution has successfully completed its random access procedure.

FIG. 7 shows an example of a MAC PDU consisting of MAC random access responses (RARs). A Medium Access Control (MAC) Protocol Data Unit (PDU) for RA Response (RAR or msg2) consists of one or more MAC subPDUs and optionally padding. Each MAC subPDU consists one of the following:

a MAC subheader with Backoff Indicator only;
a MAC subheader with RAPID only (i.e. acknowledgment for SI request);
a MAC subheader with RAPID and MAC RAR.

A MAC subheader with Backoff Indicator consists of five header fields E/T/R/R/BI as described in FIG. 8 (corresponding to Figure 6.1.5-1 of 3GPP TS 38.321 v15.4.0). A MAC subPDU with Backoff Indicator (BI) only is placed at the beginning of the MAC PDU, if included. 'MAC subPDU(s) with RAPID only' and 'MAC subPDU(s) with RAPID and MAC RAR' can be placed anywhere between MAC subPDU with Backoff Indicator only (if any) and padding (if any).

A MAC subheader with RAPID consists of three header fields E/T/RAPID as described in FIG. 9 (corresponding to Figure 6.1.5-2 of TS 38.321 v15.4.0).

Padding is placed at the end of the MAC PDU if present. Presence and length of padding is implicit based on transport block (TB) size, size of MAC subPDU(s).

For both subheaders, the fields have the following explanations:

E: The Extension field is a flag indicating if the MAC subPDU including this MAC subheader is the last MAC subPDU or not in the MAC PDU. The E field is set to "1" to indicate at least another MAC subPDU follows. The E field is set to "0" to indicate that the MAC subPDU including this MAC subheader is the last MAC subPDU in the MAC PDU;

T: The Type field is a flag indicating whether the MAC subheader contains a Random Access Preamble ID or a Backoff Indicator. The T field is set to "0" to indicate the presence of a Backoff Indicator field in the subheader (BI). The T field is set to "1" to indicate the presence of a Random Access Preamble ID field in the subheader (RAPID);

R: Reserved bit, set to "0";

BI: The Backoff Indicator field identifies the overload condition in the cell. The size of the BI field is 4 bits;

RAPID: The Random Access Preamble IDentifier field identifies the transmitted Random Access Preamble. The size of the RAPID field is 6 bits. If the RAPID in the MAC subheader of a MAC subPDU corresponds to one of the Random Access Preambles configured for SI request, MAC RAR is not included in the MAC subPDU.

If a UE receives a RAR with the E/T/R/R/BI mac subheader but no 'MAC subPDU(s) with RAPID and MAC RAR' with RAPID matching its preamble transmission, the UE will back-off for a random time between 0 and a time indicated by the BI field before doing a new preamble transmission attempt, i.e. return to Random Access Resource selection (Section 5.1.2 in 38.321 v15.4.0).

Figure 10:
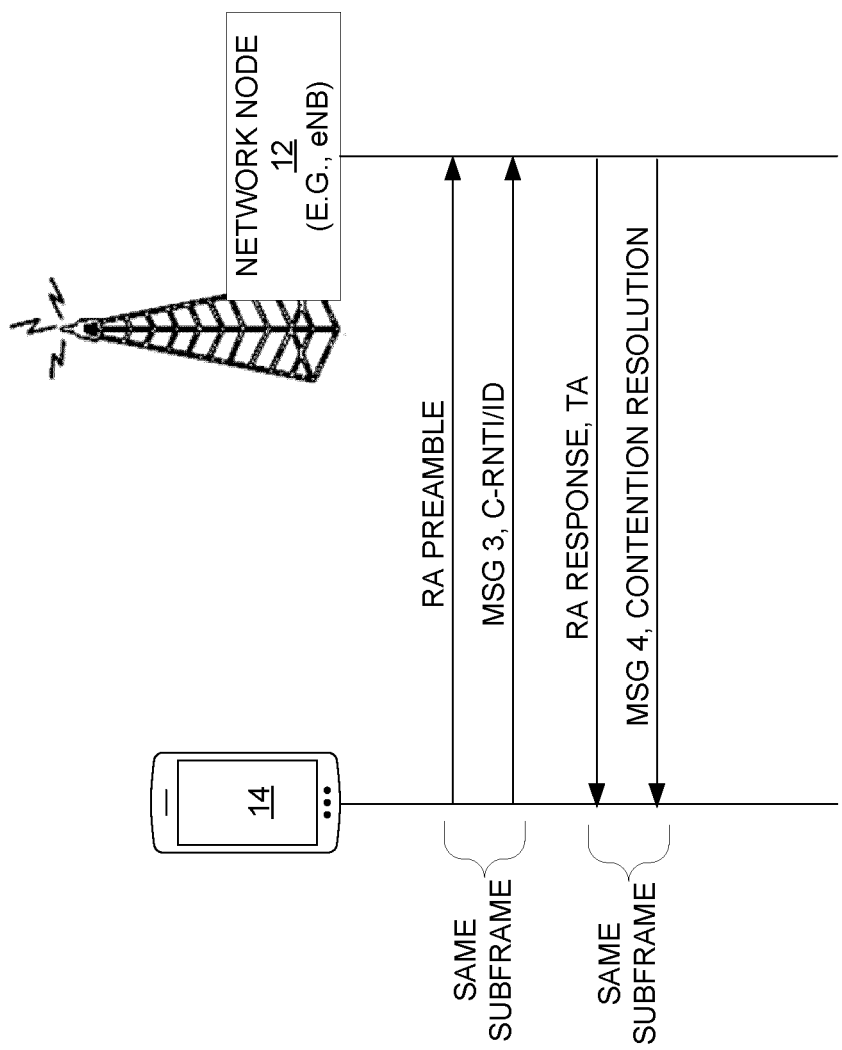
FIG. 10 is a call flow diagram of a 2-step random access procedure according to some embodiments.

A 2-step RA procedure gives much shorter latency than the ordinary 4 step RA. In the 2 step RA, the preamble (transmitted on PRACH) and a message corresponding to Message 3 (transmitted on PUSCH) in the 4 step RA are transmitted in the same or in two subsequent sub frames. The first message in the 2-step procedure is denoted Message A (MsgA). The 2-step procedure is depicted in FIG. 10. In the 4-step procedure, the grant is linked to a particular preamble. The same kind of mapping will be needed in the 2-step procedure. For all different preamble ids that have been configured for the 2-step there must be a mapping to a particular PUSCH resource. The PUSCH resource may be time multiplexed, frequency multiplexed or code multiplexed.

Upon successful reception of MsgA (i.e. both the preamble and Msg 3), the eNB will respond with a TA (which by assumption should not be needed or just give very minor updates) and a Msg 4 for contention resolution. The second message in the 2-step procedure is denoted Message B (MsgB) in NR-U.

In the two step procedure, there will be a timer, hereafter called "msgB reception timer", in which msgB must be received. It should be noted that in the 4-step procedure, there were two different timers governing when the network response must be received. In the 2-step procedure, only one is used.

In case the UE does not receive a MsgB, it would re-try with a new MsgA, similar to the action taken by the UE which does not receive a RAR in the 4-step procedure.

In case the UE is in connected mode, MsgA may contain the UEs C-RNTI and the msgB may be identified by Physical Downlink Control Channel (PDCCH) scrambled by the C-RNTI and a TA and possibly an uplink (UL) grant.

In case the UE is in idle or inactive mode, msgA may contain common control channel (CCCH) (RRC message) and the msgB may include a contention resolution MAC Control Element (CE), TA, C-RNTI and most possibly an RRC message.

Figure 11:
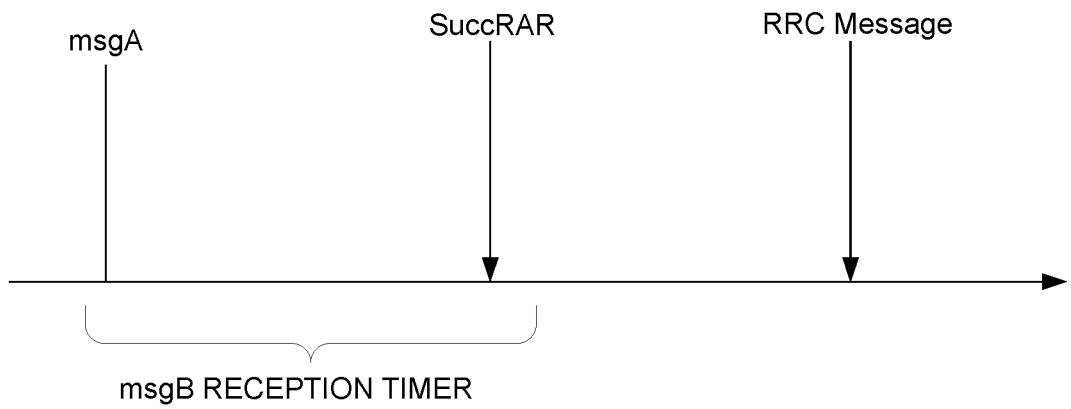
FIG. 11 is a timing diagram for a random access procedure according to some embodiments.

One option (referred to as Option 1) is to have a "SuccessRAR" containing contention resolution MAC CE, TA, C-RNTI and possibly a RAPID. The SuccessRaAR is addressed to a single UE (not multiplexed), possibly using the RA-RNTI. After receiving the SuccessRAR, the contention resolution is complete and the gNB can send the RRC message part in a later stage. The advantage with this approach is that contention resolution can be carried out quickly, e.g. using a msgB reception timer with a setting corresponding to the ra-ResponseWindow in the 4-step procedure. This is illustrated in FIG. 11. In case the RRC message is to be included, this may mean extra latency to account for RRC processing and CU/DU delays implying the need for a longer setting of msgB reception timer (corresponding to the ra-ContentionResolutionTimer in the 4-step procedure).

Figure 12:
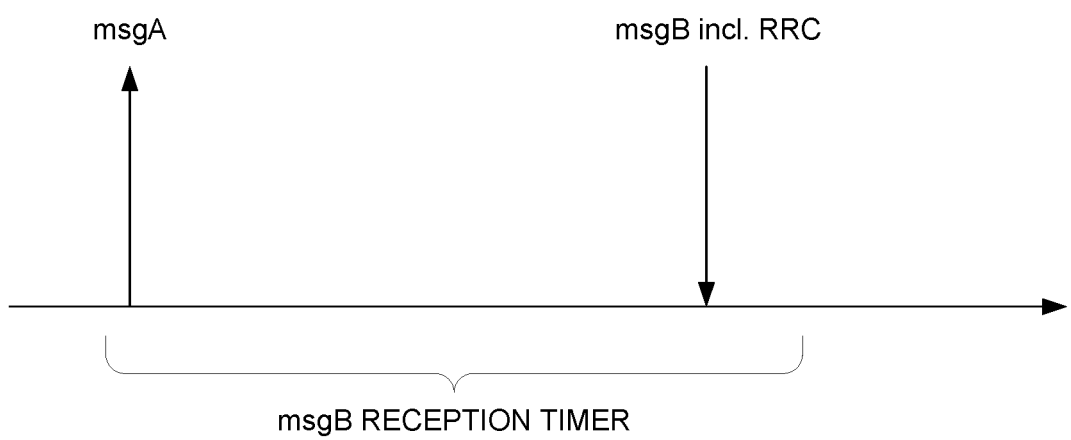
FIG. 12 is a timing diagram for a random access procedure according to other embodiments.

Another option (referred to as Option 2) would be to not send a SuccessRAR and instead wait until a complete msgB can be sent. This has the advantage that only 2 LBTs (Listen Before Talk) are needed in case of NR-U (NR Unlicensed), compared to three LBTs if the RRC part is sent in a later stage. The overall latency would be similar (since the UE needs to wait until it receives the RRC part in case of the first option) between the options, except in case the SuccessRAR would fail LBT, in which case the second option would be better. This option is illustrated in FIG. 12.

There currently exist certain challenge(s). As explained above, the setting of msgB reception timer depends on which of the two options (msgB sent in two steps or in one step) is used. Both options have advantages and may be preferable in different situations. However they may be difficult to use simultaneously. For example, the second option could require a longer length of msgB reception window compared to the first option using SuccessRAR. The two options could also require different RNTIs to identify msgB (e.g. first option might use RA-RNTI but the second option would need a new RNTI capable of handling longer reception windows). Furthermore, the methods to do back off could be different under the different options, since if a back off is sent in the shorter window, it might back off a user which otherwise would receive its msgB after the shorter window has expired.

Certain aspects of the present disclosure and their embodiments may provide solutions to these or other challenges. Some embodiments include a mechanism for how to configure the UE to know which of the options is used, e.g., by configuration.

Certain embodiments may provide one or more of the following technical advantage(s). Some embodiments enable a network to order the UE to follow a procedure consisting of a SuccessRAR and a later RRC message or a procedure where only one msgB containing both content from the SuccessRAR and the RRC message is included.

More particularly, consider now additional details of various embodiments for UEs which have transmitted a msgA in the 2-step RA procedure. Option 1 is referred to as the case where msgB in the 2-step Random Access procedure is sent in two steps: (i) A first step for contention resolution, C-RNTI assignment, and possibly TA command; and (ii) a second step consisting of an RRC message, e.g., as shown in FIG. 11. Option 2 is referred to as the case where msgB in the 2-step Random Access procedure is sent in one step (message/MAC PDU), e.g., as shown in FIG. 12. The msgB in this option 2 may contain contention resolution, C-RNTI assignment, possibly TA command and RRC message.

As a first embodiment, the network configures in system information (SI) which option (Option 1 or Option 2) is used. The configuration can be included in either the RACH-ConfigCommon or RACH-ConfigGeneric Information Element (IE) in System Information (SI) Block Type 1 (SIB1). The SI in some embodiments may contain a flag to indicate which option is configured and to indicate parameter values of the msgB reception window. The UE will then, based on the configuration in the SI, know which procedure to follow and which parameter values to use.

The procedures to follow for the different options may differ in terms of msgB reception window length, how to identify msgB (RNTI used for scrambling of PDCCH or PDCCH search space) and/or back off procedure.

The configuration of Option 1 or Option 2 may also consist of a mix of the two options, where option 1 is used for UEs in connected mode and option 2 is used for UEs in idle or inactive mode.

As a second embodiment, the option to use (Option 1 or Option 2) is signaled through dedicated RRC signaling. An RRC message in this case may contain a flag to indicate which option is configured and to indicate parameter values of msgB reception window. The UE will then, based on the configuration in the RRC message, know which procedure to follow and which parameter values to use. This may be used in e.g. hand over.

The network may decide on which option to use based on network deployment including expected RRC delays, CU/DU fronthaul or backhaul delay and/or cell layout.

Alternatively or additionally, the network may decide on which option to use based on UE categories and/or random access trigger. For example, UEs doing random access for high priority use cases may use one option while other UEs use the other option. This could be specified in the 3GPP standard and possibly combined with configuration in SI.

Alternatively or additionally, the selected option may be based on load, e.g. random access load, RRC processing load.

Figure 13:
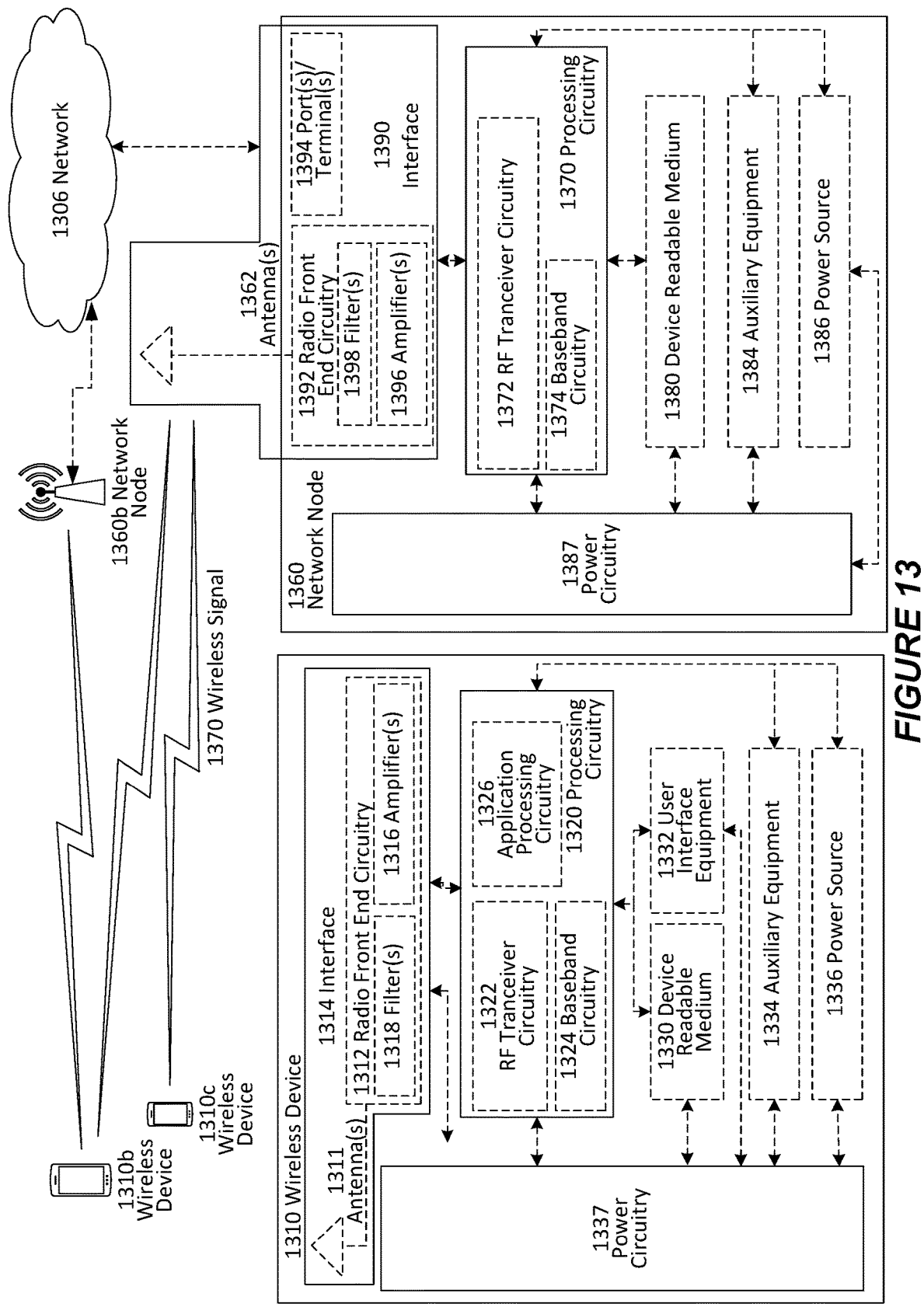
FIG. 13 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 1306, network nodes 1360 and 1360b, and WDs 1310, 1310b, and 1310c. In practice, a wireless network may further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1360 are depicted as single boxes located within a larger box, or nested within multiple boxes, in practice, a network node may comprise multiple different physical components that make up a single illustrated component (e.g., device readable medium 1380 may comprise multiple separate hard drives as well as multiple RAM modules).

Similarly, network node 1360 may be composed of multiple physically separate components (e.g., a NodeB component and a RNC component, or a BTS component and a BSC component, etc.), which may each have their own respective components. In certain scenarios in which network node 1360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1360 may be configured to support multiple radio access technologies (RATs). In such embodiments, some components may be duplicated (e.g., separate device readable medium 1380 for the different RATs) and some components may be reused (e.g., the same antenna 1362 may be shared by the RATs). Network node 1360 may also include multiple sets of the various illustrated components for different wireless technologies integrated into network node 1360, such as, for example, GSM, WCDMA, LTE, NR, WiFi, or Bluetooth wireless technologies. These wireless technologies may be integrated into the same or different chip or set of chips and other components within network node 1360.

Processing circuitry 1370 is configured to perform any determining, calculating, or similar operations (e.g., certain obtaining operations) described herein as being provided by a network node. These operations performed by processing circuitry 1370 may include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 may execute instructions stored in device readable medium 1380 or in memory within processing circuitry 1370. Such functionality may include providing any of the various wireless features, functions, or benefits discussed herein. In some embodiments, processing circuitry 1370 may include a system on a chip (SOC).

In some embodiments, processing circuitry 1370 may include one or more of radio frequency (RF) transceiver circuitry 1372 and baseband processing circuitry 1374. In some embodiments, radio frequency (RF) transceiver circuitry 1372 and baseband processing circuitry 1374 may be on separate chips (or sets of chips), boards, or units, such as radio units and digital units. In alternative embodiments, part or all of RF transceiver circuitry 1372 and baseband processing circuitry 1374 may be on the same chip or set of chips, boards, or units In certain embodiments, some or all of the functionality described herein as being provided by a network node, base station, eNB or other such network device may be performed by processing circuitry 1370 executing instructions stored on device readable medium 1380 or memory within processing circuitry 1370. In alternative embodiments, some or all of the functionality may be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360, but are enjoyed by network node 1360 as a whole, and/or by end users and the wireless network generally.

Device readable medium 1380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1370. Device readable medium 1380 may store any suitable instructions, data or information, including a computer program, software, an application including one or more of logic, rules, code, tables, etc. and/or other instructions capable of being executed by processing circuitry 1370 and, utilized by network node 1360. Device readable medium 1380 may be used to store any calculations made by processing circuitry 1370 and/or any data received via interface 1390. In some embodiments, processing circuitry 1370 and device readable medium 1380 may be considered to be integrated.

Interface 1390 is used in the wired or wireless communication of signalling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that may be coupled to, or in certain embodiments a part of, antenna 1362. Radio front end circuitry 1392 comprises filters 1398 and amplifiers 1396. Radio front end circuitry 1392 may be connected to antenna 1362 and processing circuitry 1370. Radio front end circuitry may be configured to condition signals communicated between antenna 1362 and processing circuitry 1370. Radio front end circuitry 1392 may receive digital data that is to be sent out to other network nodes or WDs via a wireless connection. Radio front end circuitry 1392 may convert the digital data into a radio signal having the appropriate channel and bandwidth parameters using a combination of filters 1398 and/or amplifiers 1396. The radio signal may then be transmitted via antenna 1362. Similarly, when receiving data, antenna 1362 may collect radio signals which are then converted into digital data by radio front end circuitry 1392. The digital data may be passed to processing circuitry 1370. In other embodiments, the interface may comprise different components and/or different combinations of components.

In certain alternative embodiments, network node 1360 may not include separate radio front end circuitry 1392, instead, processing circuitry 1370 may comprise radio front end circuitry and may be connected to antenna 1362 without separate radio front end circuitry 1392. Similarly, in some embodiments, all or some of RF transceiver circuitry 1372 may be considered a part of interface 1390. In still other embodiments, interface 1390 may include one or more ports or terminals 1394, radio front end circuitry 1392, and RF transceiver circuitry 1372, as part of a radio unit (not shown), and interface 1390 may communicate with baseband processing circuitry 1374, which is part of a digital unit (not shown).

Antenna 1362 may include one or more antennas, or antenna arrays, configured to send and/or receive wireless signals. Antenna 1362 may be coupled to radio front end circuitry 1390 and may be any type of antenna capable of transmitting and receiving data and/or signals wirelessly. In some embodiments, antenna 1362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1362 may be separate from network node 1360 and may be connectable to network node 1360 through an interface or port.

Antenna 1362, interface 1390, and/or processing circuitry 1370 may be configured to perform any receiving operations and/or certain obtaining operations described herein as being performed by a network node. Any information, data and/or signals may be received from a wireless device, another network node and/or any other network equipment. Similarly, antenna 1362, interface 1390, and/or processing circuitry 1370 may be configured to perform any transmitting operations described herein as being performed by a network node. Any information, data and/or signals may be transmitted to a wireless device, another network node and/or any other network equipment.

Power circuitry 1387 may comprise, or be coupled to, power management circuitry and is configured to supply the components of network node 1360 with power for performing the functionality described herein. Power circuitry 1387 may receive power from power source 1386. Power source 1386 and/or power circuitry 1387 may be configured to provide power to the various components of network node 1360 in a form suitable for the respective components (e.g., at a voltage and current level needed for each respective component). Power source 1386 may either be included in, or external to, power circuitry 1387 and/or network node 1360. For example, network node 1360 may be connectable to an external power source (e.g., an electricity outlet) via an input circuitry or interface such as an electrical cable, whereby the external power source supplies power to power circuitry 1387. As a further example, power source 1386 may comprise a source of power in the form of a battery or battery pack which is connected to, or integrated in, power circuitry 1387. The battery may provide backup power should the external power source fail. Other types of power sources, such as photovoltaic devices, may also be used.

Alternative embodiments of network node 1360 may include additional components beyond those shown in FIG. 13 that may be responsible for providing certain aspects of the network node's functionality, including any of the functionality described herein and/or any functionality necessary to support the subject matter described herein. For example, network node 1360 may include user interface equipment to allow input of information into network node 1360 and to allow output of information from network node 1360. This may allow a user to perform diagnostic, maintenance, repair, and other administrative functions for network node 1360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 may include multiple sets of one or more of the illustrated components for different wireless technologies supported by WD 1310, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1310.

Antenna 1311 may include one or more antennas or antenna arrays, configured to send and/or receive wireless signals, and is connected to interface 1314. In certain alternative embodiments, antenna 1311 may be separate from WD 1310 and be connectable to WD 1310 through an interface or port. Antenna 1311, interface 1314, and/or processing circuitry 1320 may be configured to perform any receiving or transmitting operations described herein as being performed by a WD. Any information, data and/or signals may be received from a network node and/or another WD. In some embodiments, radio front end circuitry and/or antenna 1311 may be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320, and is configured to condition signals communicated between antenna 1311 and processing circuitry 1320. Radio front end circuitry 1312 may be coupled to or a part of antenna 1311. In some embodiments, WD 1310 may not include separate radio front end circuitry 1312; rather, processing circuitry 1320 may comprise radio front end circuitry and may be connected to antenna 1311. Similarly, in some embodiments, some or all of RF transceiver circuitry 1322 may be considered a part of interface 1314. Radio front end circuitry 1312 may receive digital data that is to be sent out to other network nodes or WDs via a wireless connection. Radio front end circuitry 1312 may convert the digital data into a radio signal having the appropriate channel and bandwidth parameters using a combination of filters 1318 and/or amplifiers 1316. The radio signal may then be transmitted via antenna 1311. Similarly, when receiving data, antenna 1311 may collect radio signals which are then converted into digital data by radio front end circuitry 1312. The digital data may be passed to processing circuitry 1320. In other embodiments, the interface may comprise different components and/or different combinations of components.

Processing circuitry 1320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality may include providing any of the various wireless features or benefits discussed herein. For example, processing circuitry 1320 may execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry may comprise different components and/or different combinations of components. In certain embodiments processing circuitry 1320 of WD 1310 may comprise a SOC. In some embodiments, RF transceiver circuitry 1322, baseband processing circuitry 1324, and application processing circuitry 1326 may be on separate chips or sets of chips. In alternative embodiments, part or all of baseband processing circuitry 1324 and application processing circuitry 1326 may be combined into one chip or set of chips, and RF transceiver circuitry 1322 may be on a separate chip or set of chips. In still alternative embodiments, part or all of RF transceiver circuitry 1322 and baseband processing circuitry 1324 may be on the same chip or set of chips, and application processing circuitry 1326 may be on a separate chip or set of chips. In yet other alternative embodiments, part or all of RF transceiver circuitry 1322, baseband processing circuitry 1324, and application processing circuitry 1326 may be combined in the same chip or set of chips. In some embodiments, RF transceiver circuitry 1322 may be a part of interface 1314. RF transceiver circuitry 1322 may condition RF signals for processing circuitry 1320.

In certain embodiments, some or all of the functionality described herein as being performed by a WD may be provided by processing circuitry 1320 executing instructions stored on device readable medium 1330, which in certain embodiments may be a computer-readable storage medium. In alternative embodiments, some or all of the functionality may be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 may be configured to perform any determining, calculating, or similar operations (e.g., certain obtaining operations) described herein as being performed by a WD. These operations, as performed by processing circuitry 1320, may include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 may be operable to store a computer program, software, an application including one or more of logic, rules, code, tables, etc. and/or other instructions capable of being executed by processing circuitry 1320. Device readable medium 1330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1320. In some embodiments, processing circuitry 1320 and device readable medium 1330 may be considered to be integrated.

User interface equipment 1332 may provide components that allow for a human user to interact with WD 1310. Such interaction may be of many forms, such as visual, audial, tactile, etc. User interface equipment 1332 may be operable to produce output to the user and to allow the user to provide input to WD 1310. The type of interaction may vary depending on the type of user interface equipment 1332 installed in WD 1310. For example, if WD 1310 is a smart phone, the interaction may be via a touch screen; if WD 1310 is a smart meter, the interaction may be through a screen that provides usage (e.g., the number of gallons used) or a speaker that provides an audible alert (e.g., if smoke is detected). User interface equipment 1332 may include input interfaces, devices and circuits, and output interfaces, devices and circuits. User interface equipment 1332 is configured to allow input of information into WD 1310, and is connected to processing circuitry 1320 to allow processing circuitry 1320 to process the input information. User interface equipment 1332 may include, for example, a microphone, a proximity or other sensor, keys/buttons, a touch display, one or more cameras, a USB port, or other input circuitry. User interface equipment 1332 is also configured to allow output of information from WD 1310, and to allow processing circuitry 1320 to output information from WD 1310. User interface equipment 1332 may include, for example, a speaker, a display, vibrating circuitry, a USB port, a headphone interface, or other output circuitry. Using one or more input and output interfaces, devices, and circuits, of user interface equipment 1332, WD 1310 may communicate with end users and/or the wireless network, and allow them to benefit from the functionality described herein.

Auxiliary equipment 1334 is operable to provide more specific functionality which may not be generally performed by WDs. This may comprise specialized sensors for doing measurements for various purposes, interfaces for additional types of communication such as wired communications etc. The inclusion and type of components of auxiliary equipment 1334 may vary depending on the embodiment and/or scenario.

Power source 1336 may, in some embodiments, be in the form of a battery or battery pack. Other types of power sources, such as an external power source (e.g., an electricity outlet), photovoltaic devices or power cells, may also be used. WD 1310 may further comprise power circuitry 1337 for delivering power from power source 1336 to the various parts of WD 1310 which need power from power source 1336 to carry out any functionality described or indicated herein. Power circuitry 1337 may in certain embodiments comprise power management circuitry. Power circuitry 1337 may additionally or alternatively be operable to receive power from an external power source; in which case WD 1310 may be connectable to the external power source (such as an electricity outlet) via input circuitry or an interface such as an electrical power cable. Power circuitry 1337 may also in certain embodiments be operable to deliver power from an external power source to power source 1336. This may be, for example, for the charging of power source 1336. Power circuitry 1337 may perform any formatting, converting, or other modification to the power from power source 1336 to make the power suitable for the respective components of WD 1310 to which power is supplied.

Figure 14:
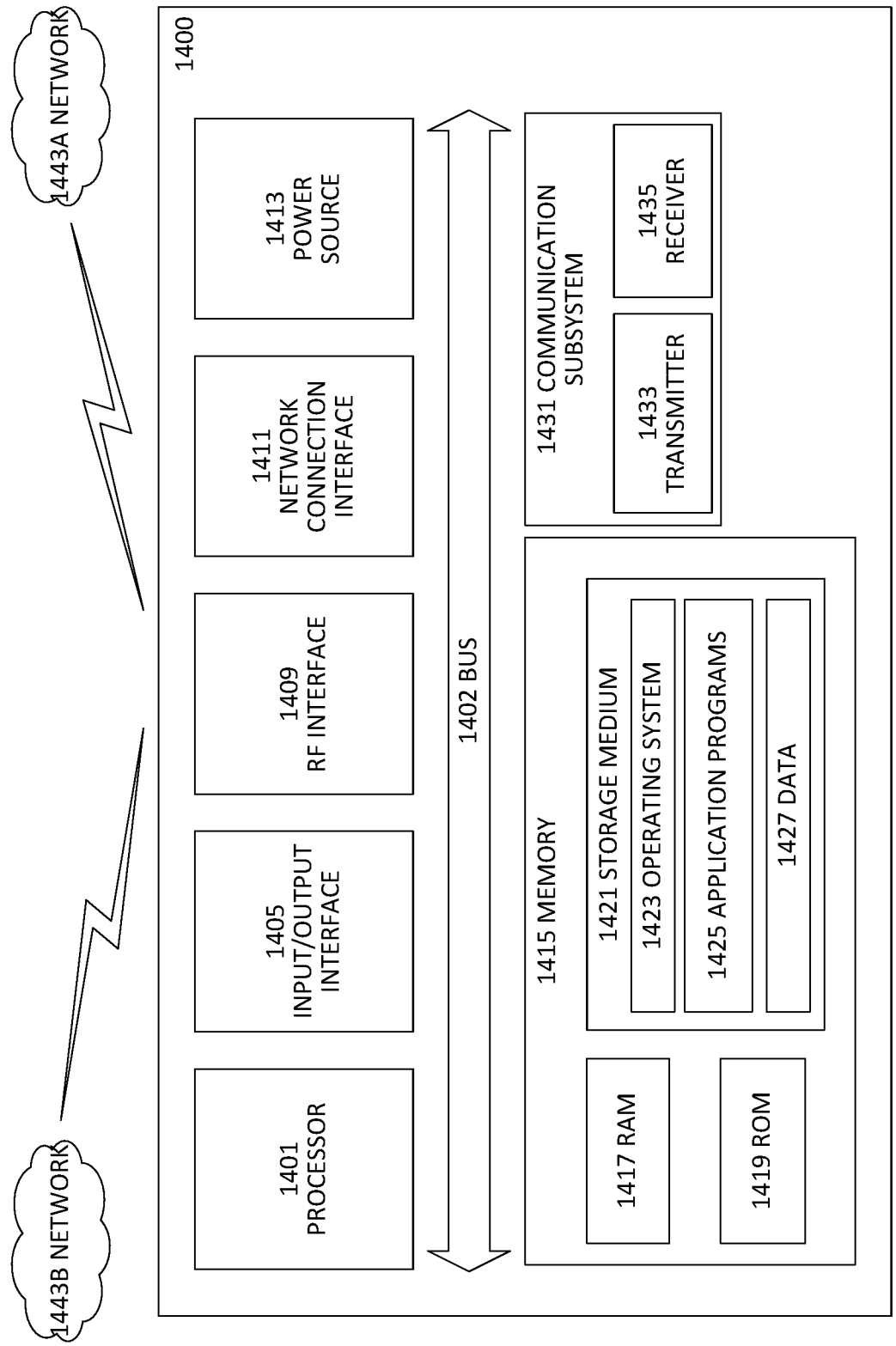
FIG. 14 is a block diagram of a user equipment according to some embodiments.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 14200 may be any UE identified by the $3^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 1401 may be configured to process computer instructions and data. Processing circuitry 1401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 may include two central processing units (CPUs). Data may be information in a form suitable for use by a computer.

In the depicted embodiment, input/output interface 1405 may be configured to provide a communication interface to an input device, output device, or input and output device. UE 1400 may be configured to use an output device via input/output interface 1405. An output device may use the same type of interface port as an input device. For example, a USB port may be used to provide input to and output from UE 1400. The output device may be a speaker, a sound card, a video card, a display, a monitor, a printer, an actuator, an emitter, a smartcard, another output device, or any combination thereof. UE 1400 may be configured to use an input device via input/output interface 1405 to allow a user to capture information into UE 1400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 1409 may be configured to provide a communication interface to RF components such as a transmitter, a receiver, and an antenna. Network connection interface 1411 may be configured to provide a communication interface to network 1443*a*. Network 1443*a* may encompass wired and/or wireless networks such as a local-area network (LAN), a wide-area network (WAN), a computer network, a wireless network, a telecommunications network, another like network or any combination thereof. For example, network 1443*a* may comprise a Wi-Fi network. Network connection interface 1411 may be configured to include a receiver and a transmitter interface used to communicate with one or more other devices over a communication network according to one or more communication protocols, such as Ethernet, TCP/IP, SONET, ATM, or the like. Network connection interface 1411 may implement receiver and transmitter functionality appropriate to the communication network links (e.g., optical, electrical, and the like). The transmitter and receiver functions may share circuit components, software or firmware, or alternatively may be implemented separately.

RAM 1417 may be configured to interface via bus 1402 to processing circuitry 1401 to provide storage or caching of data or computer instructions during the execution of software programs such as the operating system, application programs, and device drivers. ROM 1419 may be configured to provide computer instructions or data to processing circuitry 1401. For example, ROM 1419 may be configured to store invariant low-level system code or data for basic system functions such as basic input and output (I/O), startup, or reception of keystrokes from a keyboard that are stored in a non-volatile memory. Storage medium 1421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1421 may be configured to include operating system 1423, application program 1425 such as a web browser application, a widget or gadget engine or another application, and data file 1427. Storage medium 1421 may store, for use by UE 1400, any of a variety of various operating systems or combinations of operating systems.

Storage medium 1421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 may allow UE 1400 to access computer-executable instructions, application programs or the like, stored on transitory or non-transitory memory media, to off-load data, or to upload data. An article of manufacture, such as one utilizing a communication system may be tangibly embodied in storage medium 1421, which may comprise a device readable medium.

In FIG. 14, processing circuitry 1401 may be configured to communicate with network 1443*b* using communication subsystem 1431. Network 1443*a* and network 1443*b* may be the same network or networks or different network or networks. Communication subsystem 1431 may be configured to include one or more transceivers used to communicate with network 1443*b*. For example, communication subsystem 1431 may be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver may include transmitter 1433 and/or receiver 1435 to implement transmitter or receiver functionality, respectively, appropriate to the RAN links (e.g., frequency allocations and the like). Further, transmitter 1433 and receiver 1435 of each transceiver may share circuit components, software or firmware, or alternatively may be implemented separately.

In the illustrated embodiment, the communication functions of communication subsystem 1431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 may include cellular communication, Wi-Fi communication, Bluetooth communication, and GPS communication. Network 1443*b* may encompass wired and/or wireless networks such as a local-area network (LAN), a wide-area network (WAN), a computer network, a wireless network, a telecommunications network, another like network or any combination thereof. For example, network 1443*b* may be a cellular network, a Wi-Fi network, and/or a near-field network. Power source 1413 may be configured to provide alternating current (AC) or direct current (DC) power to components of UE 1400.

The features, benefits and/or functions described herein may be implemented in one of the components of UE 1400 or partitioned across multiple components of UE 1400. Further, the features, benefits, and/or functions described herein may be implemented in any combination of hardware, software or firmware. In one example, communication subsystem 1431 may be configured to include any of the components described herein. Further, processing circuitry 1401 may be configured to communicate with any of such components over bus 1402. In another example, any of such components may be represented by program instructions stored in memory that when executed by processing circuitry 1401 perform the corresponding functions described herein. In another example, the functionality of any of such components may be partitioned between processing circuitry 1401 and communication subsystem 1431. In another example, the non-computationally intensive functions of any of such components may be implemented in software or firmware and the computationally intensive functions may be implemented in hardware.

Figure 15:
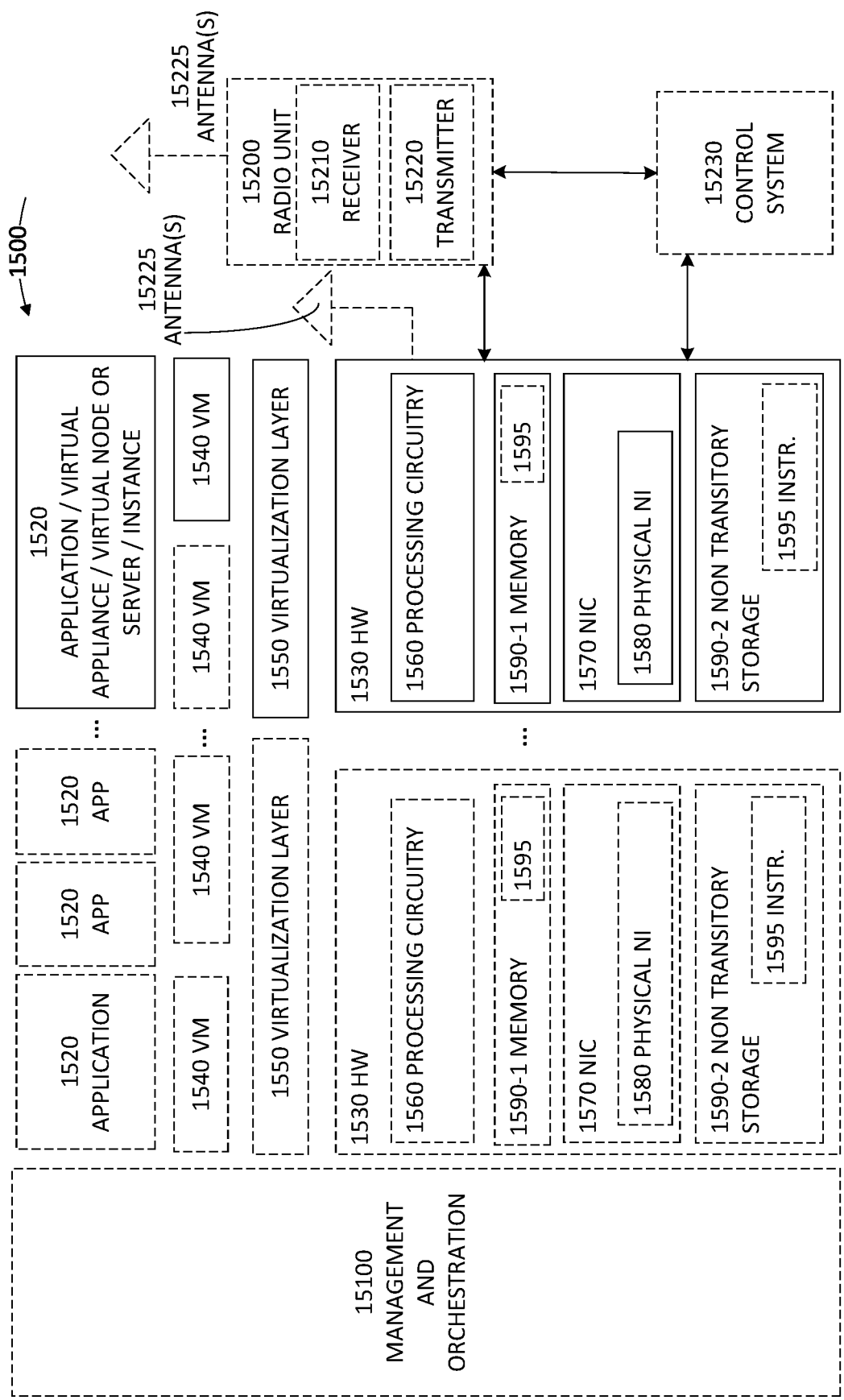
FIG. 15 is a block diagram of a virtualization environment according to some embodiments.

FIG. 15 is a schematic block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node may be entirely virtualized.

The functions may be implemented by one or more applications 1520 (which may alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500, comprises general-purpose or special-purpose network hardware devices 1530 comprising a set of one or more processors or processing circuitry 1560, which may be commercial off-the-shelf (COTS) processors, dedicated Application Specific Integrated Circuits (ASICs), or any other type of processing circuitry including digital or analog hardware components or special purpose processors. Each hardware device may comprise memory 1590-1 which may be non-persistent memory for temporarily storing instructions 1595 or software executed by processing circuitry 1560. Each hardware device may comprise one or more network interface controllers (NICs) 1570, also known as network interface cards, which include physical network interface 1580. Each hardware device may also include non-transitory, persistent, machine-readable storage media 1590-2 having stored therein software 1595 and/or instructions executable by processing circuitry 1560. Software 1595 may include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and may be run by a corresponding virtualization layer 1550 or hypervisor. Different embodiments of the instance of virtual appliance 1520 may be implemented on one or more of virtual machines 1540, and the implementations may be made in different ways.

During operation, processing circuitry 1560 executes software 1595 to instantiate the hypervisor or virtualization layer 1550, which may sometimes be referred to as a virtual machine monitor (VMM). Virtualization layer 1550 may present a virtual operating platform that appears like networking hardware to virtual machine 1540.

As shown in FIG. 15, hardware 1530 may be a standalone network node with generic or specific components. Hardware 1530 may comprise antenna 15225 and may implement some functions via virtualization. Alternatively, hardware 1530 may be part of a larger cluster of hardware (e.g. such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1540 may be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 may be coupled to one or more antennas 15225. Radio units 15200 may communicate directly with hardware nodes 1530 via one or more appropriate network interfaces and may be used in combination with the virtual components to provide a virtual node with radio capabilities, such as a radio access node or a base station.

In some embodiments, some signalling can be effected with the use of control system 15230 which may alternatively be used for communication between the hardware nodes 1530 and radio units 15200.

Figure 16:
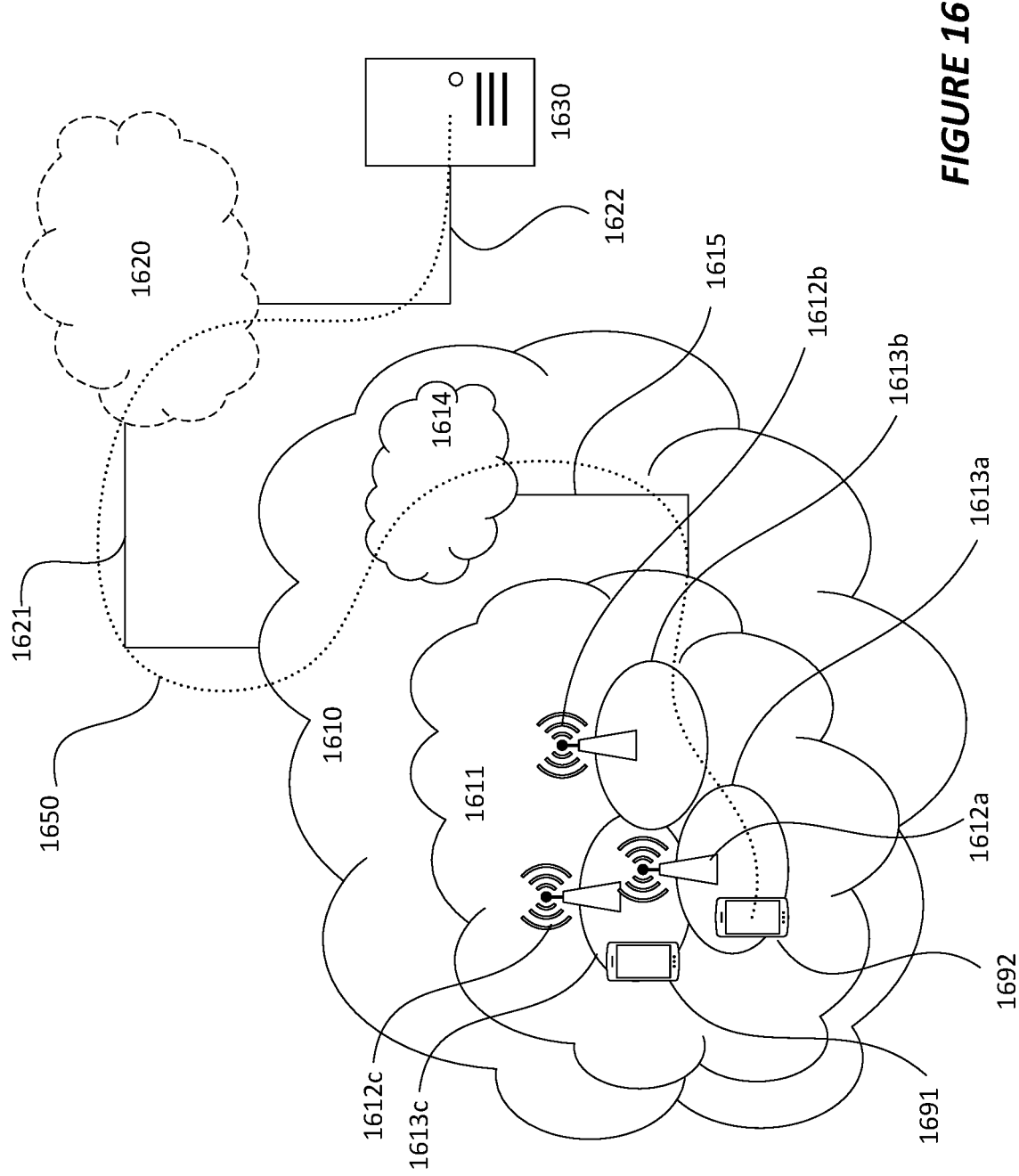
FIG. 16 is a block diagram of a communication network with a host computer according to some embodiments.

FIG. 16 illustrates a telecommunication network connected via an intermediate network to a host computer in accordance with some embodiments. In particular, with reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to core network 1614 over a wired or wireless connection 1615. A first UE 1691 located in coverage area 1613c is configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the corresponding base station 1612.

Telecommunication network 1610 is itself connected to host computer 1630, which may be embodied in the hardware and/or software of a standalone server, a cloud-implemented server, a distributed server or as processing resources in a server farm. Host computer 1630 may be under the ownership or control of a service provider, or may be operated by the service provider or on behalf of the service provider. Connections 1621 and 1622 between telecommunication network 1610 and host computer 1630 may extend directly from core network 1614 to host computer 1630 or may go via an optional intermediate network 1620. Intermediate network 1620 may be one of, or a combination of more than one of, a public, private or hosted network; intermediate network 1620, if any, may be a backbone network or the Internet; in particular, intermediate network 1620 may comprise two or more sub-networks (not shown).

The communication system of FIG. 16 as a whole enables connectivity between the connected UEs 1691, 1692 and host computer 1630. The connectivity may be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 may be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Figure 17:
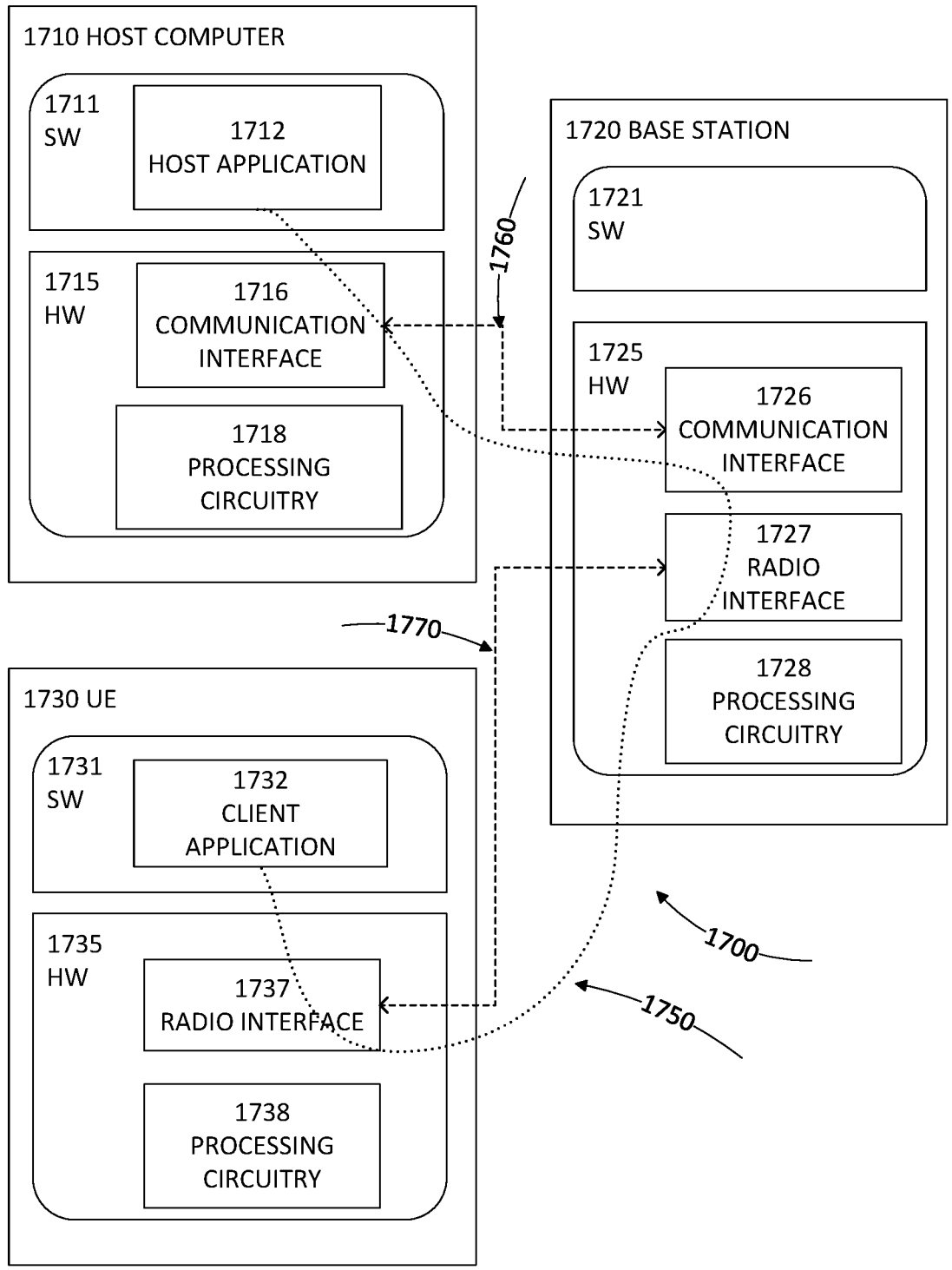
FIG. 17 is a block diagram of a host computer according to some embodiments.

Example implementations, in accordance with an embodiment, of the UE, base station and host computer discussed in the preceding paragraphs will now be described with reference to FIG. 17. FIG. 17 illustrates host computer communicating via a base station with a user equipment over a partially wireless connection in accordance with some embodiments In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which may have storage and/or processing capabilities. In particular, processing circuitry 1718 may comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 may be operable to provide a service to a remote user, such as UE 1730 connecting via OTT connection 1750 terminating at UE 1730 and host computer 1710. In providing the service to the remote user, host application 1712 may provide user data which is transmitted using OTT connection 1750.

Communication system 1700 further includes base station 1720 provided in a telecommunication system and comprising hardware 1725 enabling it to communicate with host computer 1710 and with UE 1730. Hardware 1725 may include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 may be configured to facilitate connection 1760 to host computer 1710. Connection 1760 may be direct or it may pass through a core network (not shown in FIG. 17) of the telecommunication system and/or through one or more intermediate networks outside the telecommunication system. In the embodiment shown, hardware 1725 of base station 1720 further includes processing circuitry 1728, which may comprise one or more programmable processors, application-specific integrated circuits, field programmable gate arrays or combinations of these (not shown) adapted to execute instructions. Base station 1720 further has software 1721 stored internally or accessible via an external connection.

Communication system 1700 further includes UE 1730 already referred to. Its hardware 1735 may include radio interface 1737 configured to set up and maintain wireless connection 1770 with a base station serving a coverage area in which UE 1730 is currently located. Hardware 1735 of UE 1730 further includes processing circuitry 1738, which may comprise one or more programmable processors, application-specific integrated circuits, field programmable gate arrays or combinations of these (not shown) adapted to execute instructions. UE 1730 further comprises software 1731, which is stored in or accessible by UE 1730 and executable by processing circuitry 1738. Software 1731 includes client application 1732. Client application 1732 may be operable to provide a service to a human or non-human user via UE 1730, with the support of host computer 1710. In host computer 1710, an executing host application 1712 may communicate with the executing client application 1732 via OTT connection 1750 terminating at UE 1730 and host computer 1710. In providing the service to the user, client application 1732 may receive request data from host application 1712 and provide user data in response to the request data. OTT connection 1750 may transfer both the request data and the user data. Client application 1732 may interact with the user to generate the user data that it provides.

It is noted that host computer 1710, base station 1720 and UE 1730 illustrated in FIG. 17 may be similar or identical to host computer 1630, one of base stations 1612*a*, 1612*b*, 1612*c* and one of UEs 1691, 1692 of FIG. 16, respectively. This is to say, the inner workings of these entities may be as shown in FIG. 17 and independently, the surrounding network topology may be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure may determine the routing, which it may be configured to hide from UE 1730 or from the service provider operating host computer 1710, or both. While OTT connection 1750 is active, the network infrastructure may further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments improve the performance of OTT services provided to UE 1730 using OTT connection 1750, in which wireless connection 1770 forms the last segment.

A measurement procedure may be provided for the purpose of monitoring data rate, latency and other factors on which the one or more embodiments improve. There may further be an optional network functionality for reconfiguring OTT connection 1750 between host computer 1710 and UE 1730, in response to variations in the measurement results. The measurement procedure and/or the network functionality for reconfiguring OTT connection 1750 may be implemented in software 1711 and hardware 1715 of host computer 1710 or in software 1731 and hardware 1735 of UE 1730, or both. In embodiments, sensors (not shown) may be deployed in or in association with communication devices through which OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of OTT connection 1750 may include message format, retransmission settings, preferred routing etc.; the reconfiguring need not affect base station 1720, and it may be unknown or imperceptible to base station 1720. Such procedures and functionalities may be known and practiced in the art. In certain embodiments, measurements may involve proprietary UE signaling facilitating host computer 1710's measurements of throughput, propagation times, latency and the like. The measurements may be implemented in that software 1711 and 1731 causes messages to be transmitted, in particular empty or 'dummy' messages, using OTT connection 1750 while it monitors propagation times, errors etc.

Figure 18:
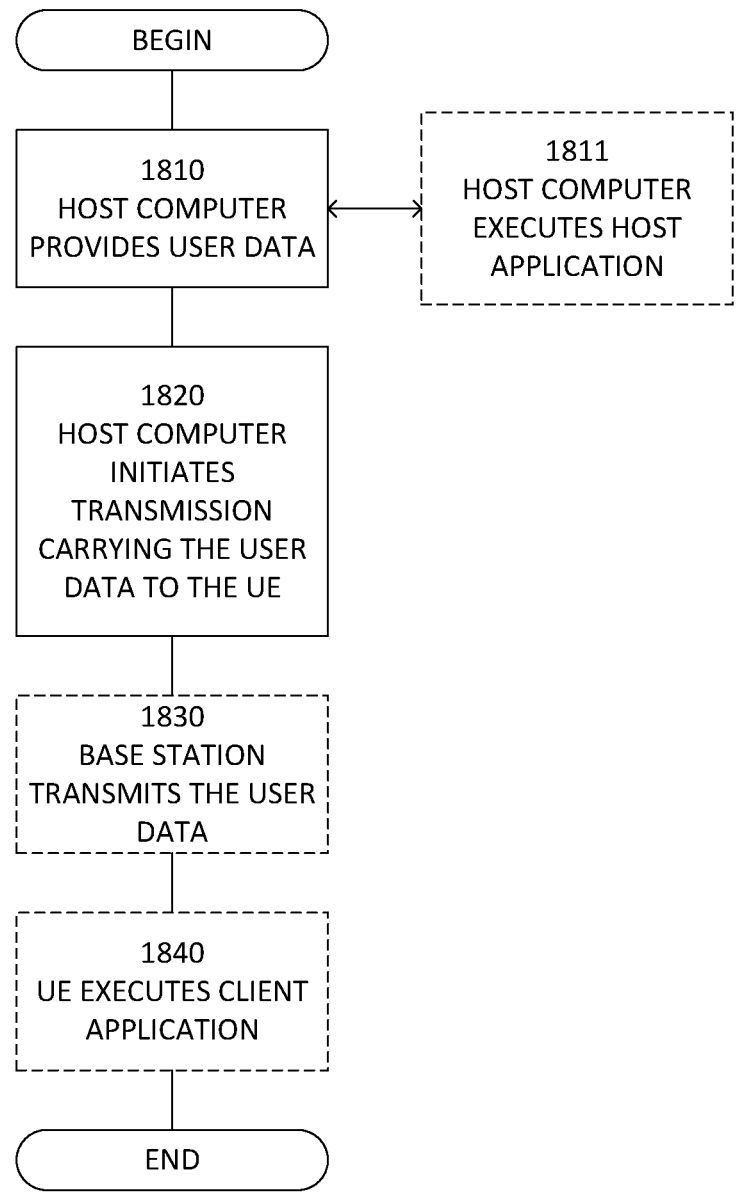
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 1810, the host computer provides user data. In substep 1811 (which may be optional) of step 1810, the host computer provides the user data by executing a host application. In step 1820, the host computer initiates a transmission carrying the user data to the UE. In step 1830 (which may be optional), the base station transmits to the UE the user data which was carried in the transmission that the host computer initiated, in accordance with the teachings of the embodiments described throughout this disclosure. In step 1840 (which may also be optional), the UE executes a client application associated with the host application executed by the host computer.

Figure 19:
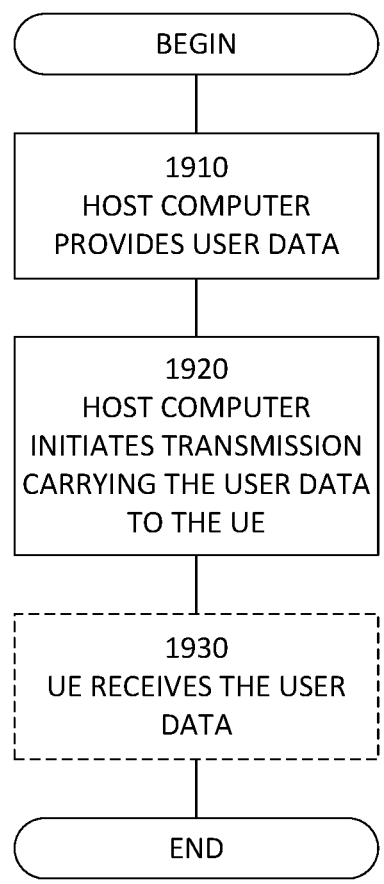
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission may pass via the base station, in accordance with the teachings of the embodiments described throughout this disclosure. In step 1930 (which may be optional), the UE receives the user data carried in the transmission.

Figure 20:
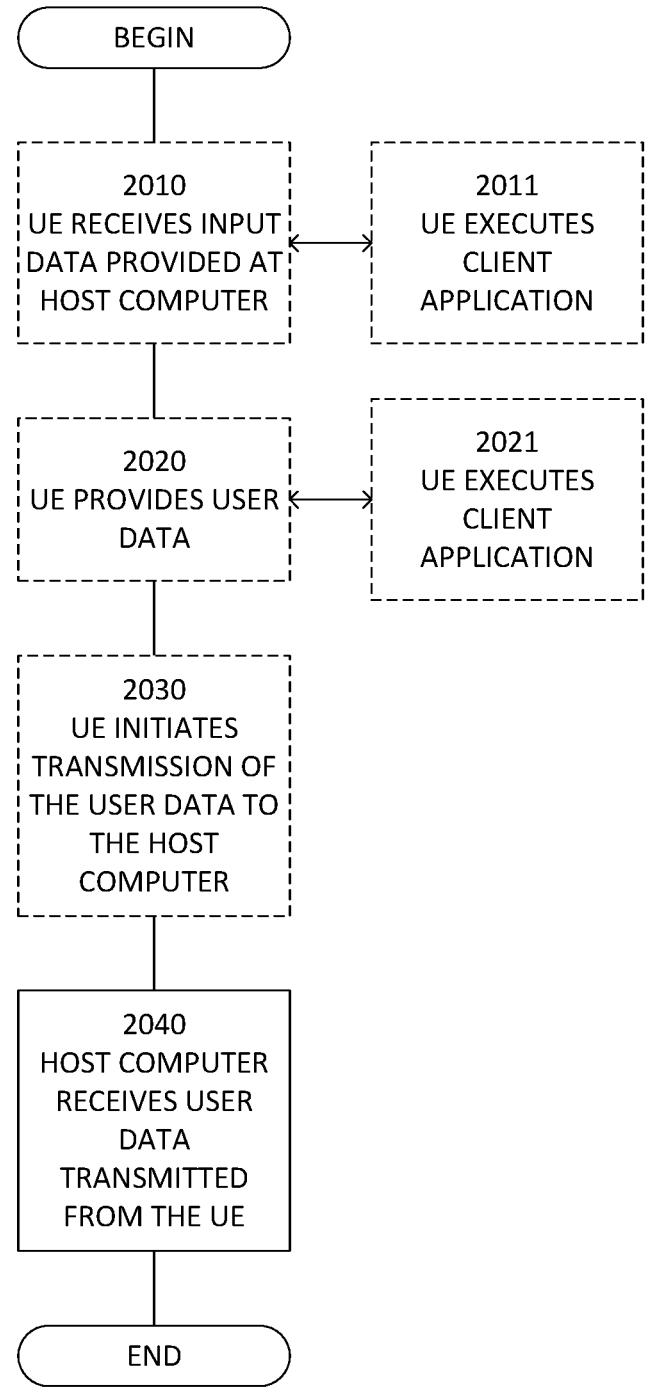
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 2010 (which may be optional), the UE receives input data provided by the host computer. Additionally or alternatively, in step 2020, the UE provides user data. In substep 2021 (which may be optional) of step 2020, the UE provides the user data by executing a client application. In substep 2011 (which may be optional) of step 2010, the UE executes a client application which provides the user data in reaction to the received input data provided by the host computer. In providing the user data, the executed client application may further consider user input received from the user. Regardless of the specific manner in which the user data was provided, the UE initiates, in substep 2030 (which may be optional), transmission of the user data to the host computer. In step 2040 of the method, the host computer receives the user data transmitted from the UE, in accordance with the teachings of the embodiments described throughout this disclosure.

Figure 21:
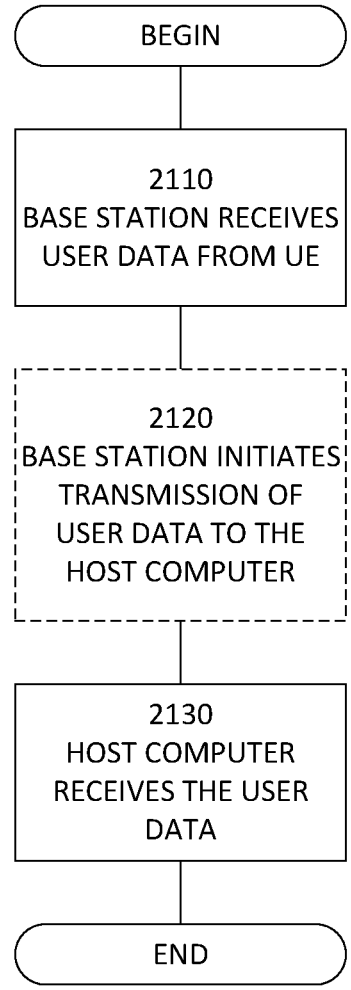
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step 2110 (which may be optional), in accordance with the teachings of the embodiments described throughout this disclosure, the base station receives user data from the UE. In step 2120 (which may be optional), the base station initiates transmission of the received user data to the host computer. In step 2130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Example embodiments of the techniques and apparatus described herein include, but are not limited to, the following enumerated examples:

Group A Embodiments

A1. A method performed by a wireless device, the method comprising:
  receiving, from a network node, information indicating whether or not a medium access control, MAC, service data unit, SDU, for a signaling radio bearer, SRB, or data radio bearer, DRB, is to be received by the wireless device in the same MAC protocol data unit, PDU, as a MAC PDU carrying a random access success response message, wherein the random access success response message indicates both a random access channel and an uplink shared channel payload were decoded successfully.

A2. The method of embodiment A1, wherein the MAC SDU for an SRB or DRB includes or conveys radio resource control, RRC, signaling.

A3. The method of any of embodiments A1-A2, wherein the MAC SDU for an SRB or DRB includes or conveys an RRC setup message or an RRC resume message.

A4. The method of any of embodiments A1-A3, wherein the information comprises system information.

A5. The method of any of embodiments A1-A4, wherein the information is included in a System Information Block Type 1, SIB1, wherein the SIB1 indicates scheduling of one or more other System Information Blocks.

A6. The method of any of embodiments A1-A3, wherein the information is received via dedicated RRC signaling.

A7. The method of any of embodiments A1-A6, wherein the information includes a flag that indicates whether or not a MAC SDU for an SRB or DRB is to be received by the wireless device in the same MAC PDU as a MAC PDU carrying a random access success response message.

A8. The method of any of embodiments A1-A7, wherein the information further indicates one or more parameter values that govern reception of the random access success response message or a MAC PDU carrying the random access success response message.

A9. The method of embodiment A8, wherein the one or more parameter values include one or more of:
  a value for a reception window within which the wireless device must receive the random access success response message or a MAC PDU carrying the random access success response message; or
  an identity with which the wireless device is to descramble a control channel on which, or a control channel search space within which, the random access success response message or a MAC PDU carrying the random access success response message is to be sent.

A10. The method of any of embodiments A1-A7, wherein the information further indicates a backoff procedure for random access by the wireless device.

A11. The method of any of embodiments A1-A10, wherein the MAC PDU carrying the random access success response message is a shared message addressed to multiple wireless devices.

A12. The method of any of embodiments A1-A11, wherein the random access success response message indicates one or more of:
  a contention resolution identity;
  a cell radio network temporary identity, C-RNTI;
  a timing advance command;
  an uplink grant; or
  a random access preamble identifier.

A13. The method of any of embodiments A1-A12, further comprising transmitting the random access channel and the uplink shared channel payload.

A14. The method of any of embodiments A1-A13, further comprising receiving a MAC PDU carrying the random access success response message.

A15. The method of embodiment A14, further comprising processing the received MAC PDU based on the received information indicating whether a MAC SDU for an SRB or DRB is included in the received MAC PDU.

A16. The method of any of embodiments A1-A13, further comprising stopping a random access response reception timer upon:
  determining that the random access success response message has been received;
  receiving the random access success response message; or
  receiving the MAC PDU carrying the random access success response message.

A17. The method of embodiment A16, wherein the random access response reception timer has a value that depends or is based on whether a MAC SDU for an SRB or DRB is to be received by the wireless device in the same PAC PDU as a MAC PDU carrying the random access success response message.

A18. The method of any of embodiments A16-A17, further comprising starting the random access response reception timer after an uplink shared channel transmission opportunity for transmission of a message conveying the random access channel and the uplink shared channel payload.

A19. The method of any of embodiments A1-A18, further comprising determining a value for a random access response reception timer based on the received information.

A20. The method of any of embodiments A1-A19, further comprising determining, based on the received information, a radio network temporary identity to use for receiving the random access success response message.

A21. The method of any of embodiments A1-A20, wherein one or more of:
  the random access channel and the uplink shared channel payload are transmitted within unlicensed frequency spectrum; or
  the MAC PDU carrying the random access success response message is received within unlicensed frequency spectrum.

A22. The method of any of embodiments A1-A21, wherein the information indicates one or more conditions under which the MAC SDU for an SRB or DRB is to be received by the wireless device in the same MAC PDU as a MAC PDU carrying the random access success response message and/or indicates one or more conditions under which the MAC SDU for an SRB or DRB is not to be received by the wireless device in the same MAC PDU as a MAC PDU carrying the random access success response message.

A23. The method of any of embodiments A1-A22, wherein the information indicates one or more of:
  the MAC SDU for an SRB or DRB is to be received by the wireless device in the same MAC PDU as a MAC PDU carrying the random access success response message when the wireless device is in an idle mode or an inactive mode; or
  the MAC SDU for an SRB or DRB is to be received by the wireless device in a different MAC PDU than a MAC PDU carrying the random access success response message when the wireless device is in a connected mode.

AA. A method performed by a wireless device, the method comprising:
  receiving, from a network node, information indicating whether or not a MAC PDU carrying a random access success response message includes radio resource control, RRC, signaling, wherein the random access success response message indicates both a random access channel and an uplink shared channel payload were decoded successfully.

AB. A method performed by a wireless device, the method comprising:
  receiving, from a network node, information indicating whether or not a message carrying a random access success response includes radio resource control, RRC, signaling, wherein the random access success response indicates both a random access channel and an uplink shared channel payload were decoded successfully.

AC. A method performed by a wireless device, the method comprising:
  determining, based on one or more criteria, whether or not a medium access control, MAC, service data unit, SDU, for a signaling radio bearer, SRB, or data radio bearer, DRB, is to be received by the wireless device in the same MAC protocol data unit, PDU, as a MAC PDU carrying a random access success response message, wherein the random access success response message indicates both a random access channel and an uplink shared channel payload were decoded successfully.

AD. The method of embodiment AC, wherein the one or more criteria include whether:
  the random access channel and the uplink shared channel payload are transmitted within unlicensed frequency spectrum; and/or
  the MAC PDU carrying the random access success response message is received within unlicensed frequency spectrum AE. The method of any of embodiments AC-AD, wherein the one or more criteria include whether the wireless device is in an idle mode, an inactive mode, or a connected mode.

AF. The method of any of the previous embodiments, further comprising:
  providing user data; and
  forwarding the user data to a host computer via the transmission to a base station.

Group B Embodiments

B1. A method performed by a network node, the method comprising:
  transmitting, from the network node to a wireless device, information indicating whether or not a medium access control, MAC, service data unit, SDU, for a signaling radio bearer, SRB, or data radio bearer, DRB, is to be received by the wireless device in the same MAC protocol data unit, PDU, as a MAC PDU carrying a random access success response message, wherein the random access success response message indicates both a random access channel and an uplink shared channel payload were decoded successfully.

B2. The method of embodiment B1, wherein the MAC SDU for an SRB or DRB includes or conveys radio resource control, RRC, signaling.

B3. The method of any of embodiments B1-B2, wherein the MAC SDU for an SRB or DRB includes or conveys an RRC setup message or an RRC resume message.

B4. The method of any of embodiments B1-B3, wherein the information comprises system information.

B5. The method of any of embodiments B1-B4, wherein the information is included in a System Information Block Type 1, SIB1, wherein the SIB1 indicates scheduling of one or more other System Information Blocks.

B6. The method of any of embodiments B1-B3, wherein the information is received via dedicated RRC signaling.

B7. The method of any of embodiments B1-B6, wherein the information includes a flag that indicates whether or not a MAC SDU for an SRB or DRB is to be received by the wireless device in the same MAC PDU as a MAC PDU carrying a random access success response message.

B8. The method of any of embodiments B1-B7, wherein the information further indicates one or more parameter values that govern reception of the random access success response message or a MAC PDU carrying the random access success response message.

B9. The method of embodiment B8, wherein the one or more parameter values include one or more of:
  a value for a reception window within which the wireless device must receive the random access success response message or a MAC PDU carrying the random access success response message; or
  an identity with which the wireless device is to descramble a control channel on which, or a control channel search space within which, the random access success response message or a MAC PDU carrying the random access success response message is to be sent.

B10. The method of any of embodiments B1-B7, wherein the information further indicates a backoff procedure for random access by the wireless device.

B11. The method of any of embodiments B1-B10, wherein the MAC PDU carrying the random access success response message is a shared message addressed to multiple wireless devices.

B12. The method of any of embodiments B1-B11, wherein the random access success response message indicates one or more of:
  a contention resolution identity;
  a cell radio network temporary identity, C-RNTI;
  a timing advance command;
  an uplink grant; or
  a random access preamble identifier.

B13. The method of any of embodiments B1-B12, further comprising receiving the random access channel and the uplink shared channel payload.

B14. The method of any of embodiments B1-B13, further comprising transmitting a MAC PDU carrying the random access success response message.

B15. The method of embodiment B14, further comprising determining whether or not the MAC SDU for an SRB or DRB is to be received by the wireless device in the same MAC PDU as a MAC PDU carrying the random access success response message.

B16. The method of embodiment B15, wherein said determining is based on one or more of:
   a type of network deployment within which the network node is deployed;
   expected radio resource control, RRC, processing delay;
   delay between a central unit and a distributed unit of the network node; or cell layout.

B17. The method of any of embodiments B15-B16, wherein said determining is based on one or more of:
   a category or type of the wireless device;
   whether the wireless device is in connected mode, idle mode, or inactive mode;
   a random access trigger;
   a priority of the wireless device or of a transmission for the wireless device;
   a random access load; or radio resource control, RRC, processing load.

B18. The method of any of embodiments B1-B17, wherein the information further indicates a value for a random access response reception timer.

B19. The method of embodiment B18, further comprising determining the value of the random access response reception timer based on whether a MAC SDU for an SRB or DRB is included in the received MAC PDU is to be received by the wireless device in the same PAC PDU as a MAC PDU carrying the random access success response message.

B20. The method of any of embodiments B1-B19, wherein one or more of:
   the random access channel and the uplink shared channel payload are received within unlicensed frequency spectrum; or
   the MAC PDU carrying the random access success response message is transmitted within unlicensed frequency spectrum.

B21. The method of any of embodiments B1-B20, wherein the information indicates one or more conditions under which the MAC SDU for an SRB or DRB is to be received by the wireless device in the same MAC PDU as a MAC PDU carrying the random access success response message and/or indicates one or more conditions under which the MAC SDU for an SRB or DRB is not to be received by the wireless device in the same MAC PDU as a MAC PDU carrying the random access success response message.

B22. The method of any of embodiments B1-B21, wherein the information indicates one or more of:
   the MAC SDU for an SRB or DRB is to be received by the wireless device in the same MAC PDU as a MAC PDU carrying the random access success response message when the wireless device is in an idle mode or an inactive mode; or
   the MAC SDU for an SRB or DRB is to be received by the wireless device in a different MAC PDU than a MAC PDU carrying the random access success response message when the wireless device is in a connected mode.

BA. A method performed by a network node, the method comprising:
   transmitting, from the network node to a wireless device, information indicating whether or not a MAC PDU carrying a random access success response message includes radio resource control, RRC, signaling, wherein the random access success response message indicates both a random access channel and an uplink shared channel payload were decoded successfully.

AB. A method performed by a network node, the method comprising:
   transmitting, from the network node to a wireless device, information indicating whether or not a message carrying a random access success response includes radio resource control, RRC, signaling, wherein the random access success response indicates both a random access channel and an uplink shared channel payload were decoded successfully.

BC. The method of any of the previous embodiments, further comprising:
   obtaining user data; and
   forwarding the user data to a host computer or a wireless device.

Group C Embodiments

C1. A wireless device configured to perform any of the steps of any of the Group A embodiments.

C2. A wireless device comprising processing circuitry configured to perform any of the steps of any of the Group A embodiments.

C3. A wireless device comprising:
   communication circuitry; and
   processing circuitry configured to perform any of the steps of any of the Group A embodiments.

C4. A wireless device comprising:
   processing circuitry configured to perform any of the steps of any of the Group A embodiments; and
   power supply circuitry configured to supply power to the wireless device.

C5. A wireless device comprising:
   processing circuitry and memory, the memory containing instructions executable by the processing circuitry whereby the wireless device is configured to perform any of the steps of any of the Group A embodiments.

C6. A user equipment (UE) comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.

C7. A computer program comprising instructions which, when executed by at least one processor of a wireless device, causes the wireless device to carry out the steps of any of the Group A embodiments.

C8. A carrier containing the computer program of embodiment C7, wherein the carrier is one of an electronic signal, optical signal, radio signal, or computer readable storage medium.

C9. A network node configured to perform any of the steps of any of the Group B embodiments.

C10. A network node comprising processing circuitry configured to perform any of the steps of any of the Group B embodiments.

C11. A network node comprising:
  communication circuitry; and
  processing circuitry configured to perform any of the steps of any of the Group B embodiments.

C12. A network node comprising:
  processing circuitry configured to perform any of the steps of any of the Group B embodiments;
  power supply circuitry configured to supply power to the network node.

C13. A network node comprising:
  processing circuitry and memory, the memory containing instructions executable by the processing circuitry whereby the network node is configured to perform any of the steps of any of the Group B embodiments.

C14. The network node of any of embodiments C9-C13, wherein the network node is a base station.

C15. A computer program comprising instructions which, when executed by at least one processor of a network node, causes the network node to carry out the steps of any of the Group B embodiments.

C16. The computer program of embodiment C14, wherein the network node is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of any of the Group B embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:
  the processing circuitry of the host computer is configured to execute a host application, thereby providing the user data; and
  the UE comprises processing circuitry configured to execute a client application associated with the host application.

D5. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
  the processing circuitry of the host computer is configured to execute a host application, thereby providing the user data; and
  the UE's processing circuitry is configured to execute a client application associated with the host application.

D12. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
  communication interface configured to receive user data originating from a transmission from a user equipment (UE) to a base station,
  wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
  the processing circuitry of the host computer is configured to execute a host application; and
  the UE's processing circuitry is configured to execute a client application associated with the host application, thereby providing the user data.

D18. The communication system of the previous 4 embodiments, wherein:
  the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
the processing circuitry of the host computer is configured to execute a host application;
the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

What is claimed is:

1. A method performed by a wireless device, the method comprising:
receiving, from a network node, information indicating whether or not a medium access control (MAC) service data unit (SDU) for a signaling radio bearer (SRB) or data radio bearer (DRB) is to be received by the wireless device in the same MAC protocol data unit (PDU) as a MAC PDU carrying a random access success response message, wherein the random access success response message indicates both a random access channel and an uplink shared channel payload were decoded successfully; and
after receiving the information, receiving the MAC PDU carrying the random access success response message.

2. The method of claim 1, wherein the MAC SDU for an SRB or DRB includes or conveys radio resource control (RRC) signaling.

3. The method of claim 1, wherein the information comprises system information, wherein the information is received in a System Information Block Type 1 (SIB1), wherein the SIB1 indicates scheduling of one or more other System Information Blocks.

4. The method of claim 1, wherein the information further indicates one or more parameter values that govern reception of the random access success response message or a MAC PDU carrying the random access success response message, wherein the one or more parameter values include one or more of:
a value for a reception window within which the wireless device must receive the random access success response message or a MAC PDU carrying the random access success response message; or
an identity with which the wireless device is to descramble a control channel on which, or a control channel search space within which, the random access success response message or a MAC PDU carrying the random access success response message is to be sent.

5. The method of claim 1, wherein the information further indicates a backoff procedure for random access by the wireless device.

6. The method of claim 1, further comprising stopping a random access response reception timer upon:
determining that the random access success response message has been received;
receiving the random access success response message; or
receiving the MAC PDU carrying the random access success response message;
wherein the random access response reception timer has a value that depends or is based on whether a MAC SDU for an SRB or DRB is to be received by the wireless device in the same PAC PDU as a MAC PDU carrying the random access success response message.

7. The method of claim 6, further comprising starting the random access response reception timer after an uplink shared channel transmission opportunity for transmission of a message conveying the random access channel and the uplink shared channel payload.

8. The method of claim 1, further comprising determining a value for a random access response reception timer based on the received information.

9. The method of claim 1, further comprising determining, based on the received information, a radio network temporary identity to use for receiving the random access success response message.

10. The method of claim 1, wherein the information indicates one or more conditions under which the MAC SDU for an SRB or DRB is to be received by the wireless device in the same MAC PDU as a MAC PDU carrying the random access success response message and/or indicates one or more conditions under which the MAC SDU for an SRB or DRB is not to be received by the wireless device in the same MAC PDU as a MAC PDU carrying the random access success response message.

11. A method performed by a network node, the method comprising:
transmitting, from the network node to a wireless device, information indicating whether or not a medium access control (MAC) service data unit (SDU) for a signaling radio bearer (SRB) or data radio bearer (DRB) is to be received by the wireless device in the same MAC protocol data unit (PDU) as a MAC PDU carrying a random access success response message, wherein the random access success response message indicates both a random access channel and an uplink shared channel payload were decoded successfully; and
after transmitting the information, transmitting the MAC PDU carrying the random access success response message.

12. The method of claim 11, wherein the MAC SDU for an SRB or DRB includes or conveys radio resource control (RRC) signaling.

13. The method of claim 11, wherein the information comprises system information.

14. The method of claim 11, wherein the information further indicates one or more parameter values that govern reception of the random access success response message or a MAC PDU carrying the random access success response message, wherein the one or more parameter values include one or more of:
a value for a reception window within which the wireless device must receive the random access success response message or a MAC PDU carrying the random access success response message; or
an identity with which the wireless device is to descramble a control channel on which, or a control channel search space within which, the random access success response message or a MAC PDU carrying the random access success response message is to be sent.

15. The method of claim 11, wherein the information further indicates a backoff procedure for random access by the wireless device.

16. The method of claim 11, further comprising determining whether or not the MAC SDU for an SRB or DRB is to be received by the wireless device in the same MAC PDU as a MAC PDU carrying the random access success response message.

17. The method of claim 16, wherein said determining is based on one or more of:
a type of network deployment within which the network node is deployed;
expected radio resource control (RRC) processing delay;
delay between a central unit and a distributed unit of the network node; or
cell layout.

18. The method of claim 11, wherein one or more of:
the random access channel and the uplink shared channel payload are received within unlicensed frequency spectrum; or
the MAC PDU carrying the random access success response message is transmitted within unlicensed frequency spectrum.

19. The method of claim 11, wherein the information indicates one or more conditions under which the MAC SDU for an SRB or DRB is to be received by the wireless device in the same MAC PDU as a MAC PDU carrying the random access success response message and/or indicates one or more conditions under which the MAC SDU for an SRB or DRB is not to be received by the wireless device in the same MAC PDU as a MAC PDU carrying the random access success response message.

20. A wireless device comprising:
communication circuitry; and
processing circuitry configured to:
receive, from a network node, information indicating whether or not a medium access control (MAC) service data unit (SDU) for a signaling radio bearer (SRB) or data radio bearer (DRB) is to be received by the wireless device in the same MAC protocol data unit (PDU) as a MAC PDU carrying a random access success response message, wherein the random access success response message indicates both a random access channel and an uplink shared channel payload were decoded successfully; and
after receiving the information, receive the MAC PDU carrying the random access success response message.

21. The wireless device of claim 20, wherein the processing circuitry is configured to:
process the received MAC PDU based on whether, according to the received information, the MAC SDU for the SRB or DRB is included in the received MAC PDU.

22. A network node comprising:
communication circuitry; and
processing circuitry configured to:
transmit, from the network node to a wireless device, information indicating whether or not a medium access control (MAC) service data unit (SDU) for a signaling radio bearer (SRB) or data radio bearer (DRB) is to be received by the wireless device in the same MAC protocol data unit (PDU) as a MAC PDU carrying a random access success response message, wherein the random access success response message indicates both a random access channel and an uplink shared channel payload were decoded successfully; and
after transmitting the information, transmit the MAC PDU carrying the random access success response message.

23. The network node of claim 22, the processing circuitry configured to determine whether or not the MAC SDU for an SRB or DRB is to be received by the wireless device in the same MAC PDU as a MAC PDU carrying the random access success response message, wherein said determining is based on one or more of:
a type of network deployment within which the network node is deployed;
expected radio resource control (RRC) processing delay;
delay between a central unit and a distributed unit of the network node; or
cell layout.

* * * * *